US011421508B2

(12) United States Patent
Christopherson et al.

(10) Patent No.: US 11,421,508 B2
(45) Date of Patent: Aug. 23, 2022

(54) FRACTURING VALVE SYSTEMS AND METHODS

(71) Applicant: Cameron International Corporation, Houston, TX (US)

(72) Inventors: Adam Christopherson, Cypress, TX (US); Michael Krejci, Houston, TX (US); Pawan Malli, Cypress, TX (US); Leonard Vogel, Tomball, TX (US); Nicholas Ruff, Houston, TX (US); Delbert Vanderford, Cypress, TX (US); Stuart Robinson, Katy, TX (US); Dennis P. Nguyen, Pearland, TX (US)

(73) Assignee: Cameron International Corporation, Houston, TX (US)

( * ) Notice: Subject to any disclaimer, the term of this patent is extended or adjusted under 35 U.S.C. 154(b) by 300 days.

(21) Appl. No.: 16/858,205

(22) Filed: Apr. 24, 2020

(65) Prior Publication Data

US 2021/0332666 A1    Oct. 28, 2021

(51) Int. Cl.
| | |
|---|---|
| *E21B 34/02* | (2006.01) |
| *F16K 3/30* | (2006.01) |
| *F16K 3/02* | (2006.01) |
| *E21B 43/26* | (2006.01) |
| *F16K 3/18* | (2006.01) |

(52) U.S. Cl.
CPC ............ *E21B 34/025* (2020.05); *E21B 34/02* (2013.01); *E21B 43/2607* (2020.05); *F16K 3/0209* (2013.01); *F16K 3/186* (2013.01); *F16K 3/30* (2013.01); *E21B 43/26* (2013.01)

(58) Field of Classification Search
CPC .... E21B 34/025; E21B 34/02; E21B 43/2607; E21B 43/26; F16K 3/0209; F16K 3/186; F16K 3/30; F16K 3/184
USPC .................................. 251/326–329, 203–204
See application file for complete search history.

(56) References Cited

U.S. PATENT DOCUMENTS

| | | |
|---|---|---|
| 2,224,446 A | 12/1940 | Penick et al. |
| 2,238,357 A | 4/1941 | Allen |
| | (Continued) | |

FOREIGN PATENT DOCUMENTS

| | | |
|---|---|---|
| CN | 109268518 A | 1/2019 |
| EP | 2274542 B1 | 11/2016 |

OTHER PUBLICATIONS

Cameron General Catalog 1962-1963, Cameron Iron Works, Inc., Houston, Texas, cover and p. 1112 (2 pages).

*Primary Examiner* — John Bastianelli
(74) *Attorney, Agent, or Firm* — Eubanks PLLC

(57) ABSTRACT

Fracturing systems with frac valves having gates for controlling flow of fracturing fluid are provided. In one embodiment, a fracturing apparatus includes a frac valve having a housing with a cavity transverse to a bore. A gate is positioned in the cavity and is movable between open and closed positions to selectively block flow through the bore. The gate includes a seal assembly positioned to seal against a sidewall of the cavity to surround the bore and block flow through the frac valve when the gate is in the closed position. The seal assembly can be actuated between a less-energized state and a more-energized state following movement of the gate within the cavity from the open position to the closed position. Additional systems, devices, and methods for fracturing are also disclosed.

20 Claims, 17 Drawing Sheets

(56) References Cited

U.S. PATENT DOCUMENTS

| | | | | |
|---|---|---|---|---|
| 2,385,463 | A | * | 9/1945 | Penick .................. F16K 3/26 |
| | | | | 251/197 |
| 2,427,073 | A | | 9/1947 | Schweitzer |
| 2,923,310 | A | | 2/1960 | Eckert |
| 2,930,577 | A | * | 3/1960 | Bredtschneider ....... F16K 3/316 |
| | | | | 251/200 |
| 3,102,709 | A | | 9/1963 | Allen |
| 3,159,378 | A | | 12/1964 | Haag |
| 3,333,816 | A | | 8/1967 | Williams et al. |
| 3,575,377 | A | * | 4/1971 | Carlton .................. F16K 3/188 |
| | | | | 251/327 |
| 4,089,532 | A | | 5/1978 | Kamyshnikov et al. |
| 4,214,605 | A | | 7/1980 | Hardgrave |
| 4,222,406 | A | * | 9/1980 | Schaefer .................. F16K 3/12 |
| | | | | 251/327 |
| 4,405,113 | A | * | 9/1983 | Erwin .................... F16K 3/184 |
| | | | | 137/246.22 |
| 4,541,608 | A | | 9/1985 | Forester et al. |
| 5,005,802 | A | | 4/1991 | McWhorter et al. |
| 5,013,005 | A | | 5/1991 | Nance |
| 5,158,264 | A | | 10/1992 | Le et al. |
| 5,232,199 | A | * | 8/1993 | Thrasher ................ F16K 3/186 |
| | | | | 251/327 |
| 5,342,028 | A | * | 8/1994 | Nevrekar ................ F16K 5/204 |
| | | | | 251/163 |
| 5,377,955 | A | * | 1/1995 | Baker .................... F16K 3/0263 |
| | | | | 251/327 |
| 5,819,851 | A | | 10/1998 | Dallas |
| 6,164,619 | A | | 12/2000 | Van Winkle et al. |
| 6,244,336 | B1 | | 6/2001 | Kachich |
| 6,289,993 | B1 | | 9/2001 | Dallas |
| 6,296,225 | B1 | | 10/2001 | Watts |
| 6,612,546 | B2 | | 9/2003 | Young et al. |
| 6,719,262 | B2 | | 4/2004 | Whitby et al. |
| 7,207,382 | B2 | | 4/2007 | Schaeper |
| 8,573,557 | B2 | | 11/2013 | Carbaugh et al. |
| 9,115,562 | B2 | | 8/2015 | Guidry et al. |
| 9,249,643 | B2 | | 2/2016 | Melancon |
| 9,777,546 | B2 | | 10/2017 | Hoover et al. |
| 10,233,716 | B2 | | 3/2019 | van Wijk et al. |
| 2006/0113501 | A1 | | 6/2006 | Isaacks et al. |
| 2006/0254822 | A1 | | 11/2006 | Ayling |
| 2011/0030963 | A1 | | 2/2011 | Demong et al. |
| 2013/0153237 | A1 | | 6/2013 | McGuire |
| 2018/0066767 | A1 | | 3/2018 | Nesloney |
| 2018/0163501 | A1 | | 6/2018 | Guidry |
| 2020/0032608 | A1 | | 1/2020 | Christopherson et al. |
| 2020/0032609 | A1 | | 1/2020 | Guidry |

* cited by examiner

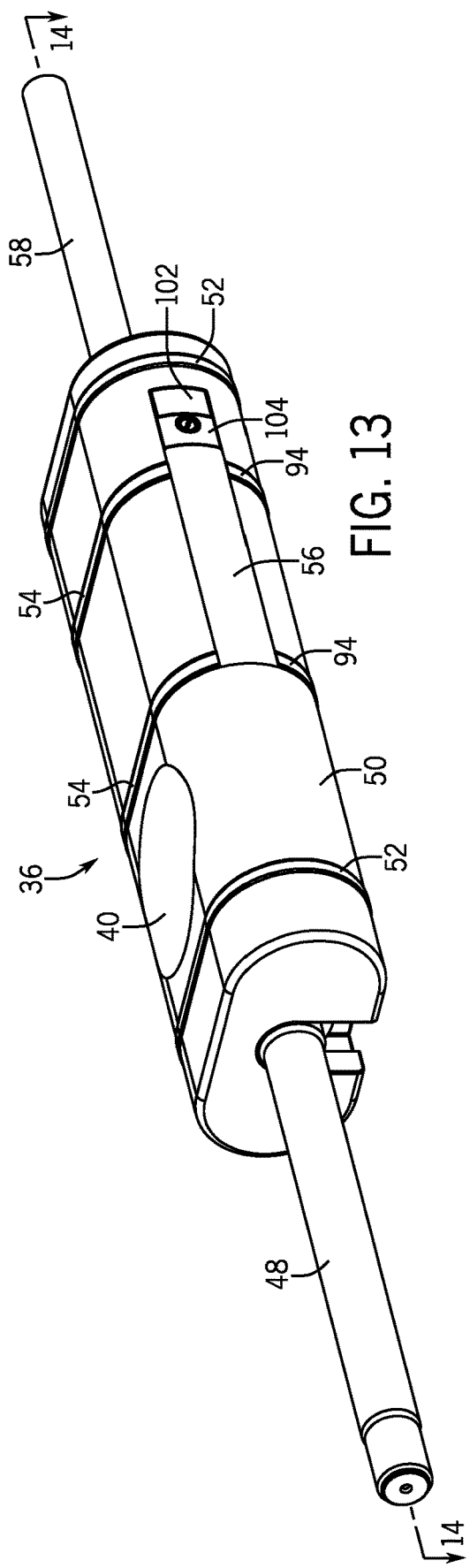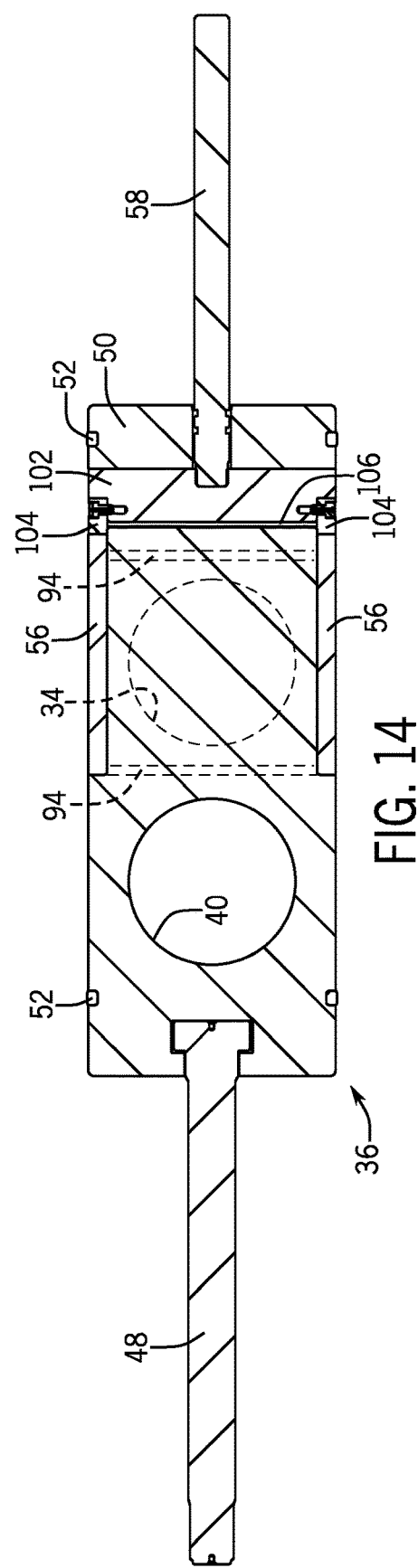

FRACTURING VALVE SYSTEMS AND METHODS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid—which is often a mixture including proppant (e.g., sand) and water—into the well to increase the well's pressure and form the man-made fractures. The high pressure of the fluid increases crack size and crack propagation through the rock formation to release oil and gas, while the proppant prevents the cracks from closing once the fluid is depressurized. During fracturing operations, fracturing fluid may be routed via fracturing lines (e.g., pipes) to fracturing trees or other assemblies installed at wellheads. Conventional fracturing trees have valves that can be opened and closed to control flow of fluid through the fracturing trees into the wells. Unfortunately, proppant may interfere with the operation of valves that control flow during fracturing operations.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to valves for controlling fluid flow. More specifically, some embodiments relate to frac valves for controlling the flow of fracturing fluid in fracturing systems. In some instances, the frac valves may be provided in a wellhead assembly or a fluid supply system (e.g., a supply manifold) to control the flow of fracturing fluid during fracturing operations at a wellsite. The frac valves may include gates that move between open and closed positions to selectively allow flow through bores of the valves. The frac valves may also include seal assemblies that are actuatable between less-energized and more-energized states. The gates can be moved between the open and closed positions with the seal assemblies in the less-energized states, and the seal assemblies can be actuated to the more-energized states to increase sealing contact pressure when the gates are in the closed positions. In at least some embodiments, seals of the actuatable sealing assemblies are elastomer seals. In addition to the seals of the actuatable sealing assemblies, the valves may include other seals that isolate ends of the gates from flow paths through the valves. These other seals are also elastomer seals in some instances.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 13 is a perspective view of a gate that may be used to control flow through the valve, with the gate having a crossbar for actuating a seal assembly of the gate, in accordance with one embodiment;

FIG. 14 is a cross-section of the gate of FIG. 13, with an actuation rod and a seal-energizing rod, in accordance with one embodiment;

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
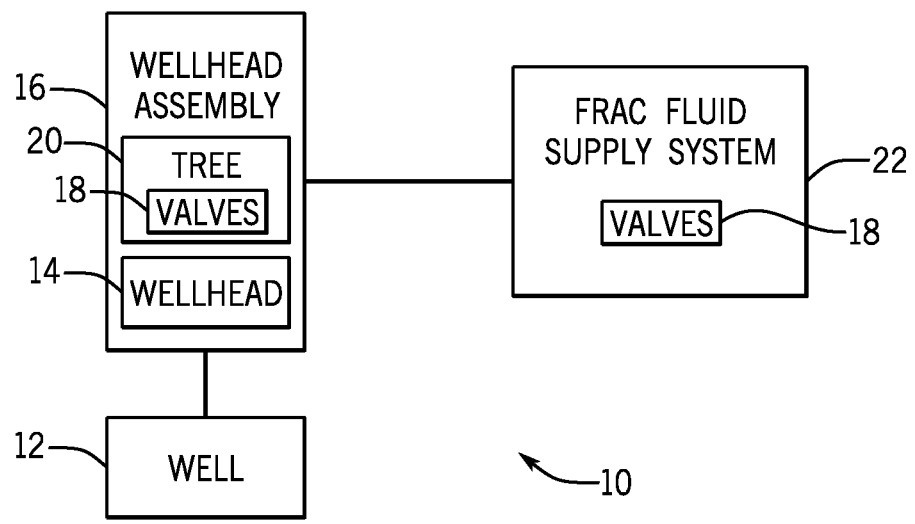
FIG. 1 generally depicts a fracturing system having valves for controlling flow in accordance with an embodiment of the present disclosure.

Turning now to the present figures, an example of a fracturing system 10 is provided in FIG. 1 in accordance with certain embodiments. The fracturing system 10 facilitates extraction of natural resources, such as oil or natural gas, from a subterranean formation via a well 12 and a wellhead 14. Particularly, by injecting a fracturing fluid into the well 12, the fracturing system 10 increases the number or size of fractures in a rock formation or strata to enhance recovery of natural resources present in the formation. Well 12 is a surface well in some embodiments, but it will be appreciated that resources may be extracted from other wells 12, such as platform or subsea wells.

The fracturing system 10 includes various components to control flow of a fracturing fluid into the well 12. For instance, the fracturing system 10 depicted in FIG. 1 includes a wellhead assembly 16 that receives fracturing fluid from a fluid supply system 22. In some embodiments, the wellhead assembly 16 includes one or more frac valves 18 to control flow of fracturing fluid into the well 12. More particularly, the wellhead assembly 16 can include a fracturing tree 20 having one or more frac valves 18. Various examples of frac valves are described below in accordance with the present techniques. In some embodiments, a fracturing tree 20 may include one or more of these frac valves to control flow of fracturing fluid through the tree 20 into the well 12 (or from the well 12 in some instances, such as during a flowback operation). Any of the described frac valves could be used as an upper master valve or a lower master valve of the fracturing tree 20, for instance. The sizes and pressure ratings of the frac valves 18 may vary depending on the intended application. But in at least some embodiments the frac valves 18 have large bores, such as a nominal bore diameter of seven and one-sixteenth inches (approximately 18 cm) and are constructed for high pressure applications, such as up to 15,000 psi (approximately 100,000 kPa). Those skilled in the art will appreciate that the fracturing tree 20 could include other elements, such as connection blocks, wing valves, a swab valve, and a frac head. In other embodiments, the wellhead assembly 16 may include one or more frac valves 18 without a fracturing tree mounted over the wellhead 14.

The fracturing fluid supply system 22 may also (or instead) include one or more frac valves 18 for controlling flow of fracturing fluid to the well 12. The frac valves 18 of the fracturing fluid supply system 22 may be provided in the form of a frac valve described below or in any other suitable form. In some embodiments, the fracturing fluid supply system 22 includes trucks that pump the fracturing fluid to the wellhead assembly 16, but any suitable sources of fracturing fluid and manners for transmitting such fluid to the wellhead assembly 16 may be used. In some instances, the fracturing fluid supply system 22 includes a fracturing manifold for distributing fracturing fluid to multiple wells 12 via respective wellhead assemblies 16. The fracturing manifold may include frac valves 18 to control flow of fracturing fluid to the individual wells 12.

In some embodiments, a frac valve 18 of the fracturing system 10 is embodied by one of the valves 30 described below. Various examples of valves 30 are described below as frac valves 30 for controlling flow of fracturing fluids. But it will be appreciated that the various valves 30 described herein could also or instead be used in other applications to convey other fluids.

Figure 2:
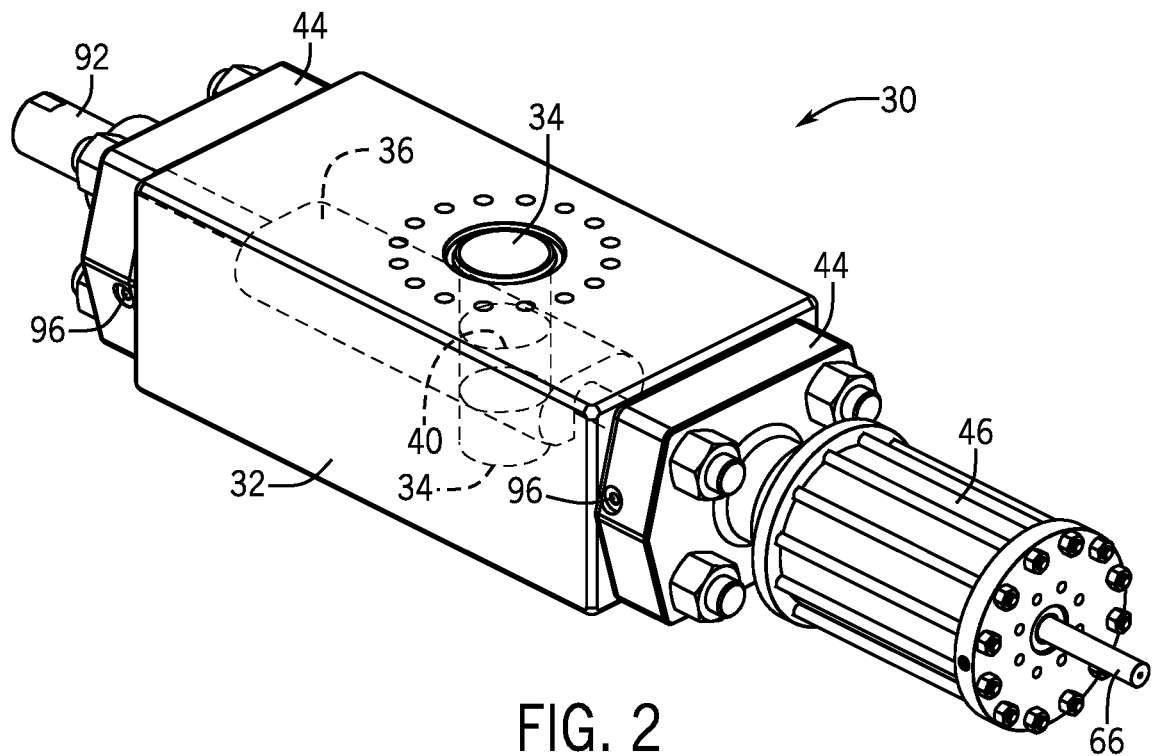
FIG. 2 is a perspective view of a valve having a gate installed in a cavity of a housing in accordance with one embodiment.

In FIG. 2, a frac valve 30 is shown including a housing (with a main body 32) and an internal gate 36. The main body 32 includes a bore 34 for conveying fracturing fluid (or other fluid) through the frac valve 30 and a cavity 38 (FIG. 6), transverse to the bore 34, in which the gate 36 is received. The gate 36 includes an aperture 40 that may be selectively aligned with the bore 34 to control flow through the frac valve 30. More specifically, flow through the frac valve 30 may be controlled by moving the gate 36 within the cavity 38 (transverse to the bore 34) between an open position that allows flow through the bore 34 via the aperture 40 and a closed position in which the body of the gate 36 blocks flow through the bore 34.

The frac valve 30 may be fastened between other components to selectively control flow of pressurized fluid between the other components. As one example, the upper surface of the main body 32 is shown as having a bolt-hole ring to facilitate fastening of the frac valve 30 to other components (e.g., via a studded flange connection) and a ring groove for receiving a gasket or other seal to inhibit leakage along the upper surface. The lower surface of the main body 32 may have similar features to facilitate connection to other components. But other manners of connecting the frac valve 30 to additional components may be used in full accordance with the present technique.

In the presently depicted embodiment, the housing of the frac valve 30 also includes bonnets 44 that enclose the gate 36 within the cavity 38. These bonnets 44 can be fastened to the main body 32 via a studded connection or in some other suitable fashion. The frac valve 30 can also include an actuator 46 for moving the gate 36 between open and closed positions within the cavity 38. By way of example, the actuator 46 may include a hydraulic actuator, a manual actuator, an electric actuator, or a pneumatic actuator, or combinations thereof. In one embodiment, for instance, the actuator 46 is a hydraulic actuator having an operating cylinder with a piston that controls the position of the gate 36 via an actuation rod 48 (FIG. 4). In another embodiment, the actuator 46 is an electric actuator having an electric motor for driving movement of the gate 36. In some embodiments, and as shown in FIGS. 2 and 3, the actuator 46 includes a rising stem 66 that moves synchronously with the gate 36 and provides a visual indication of the position of the gate 36 within the housing.

Figure 3:
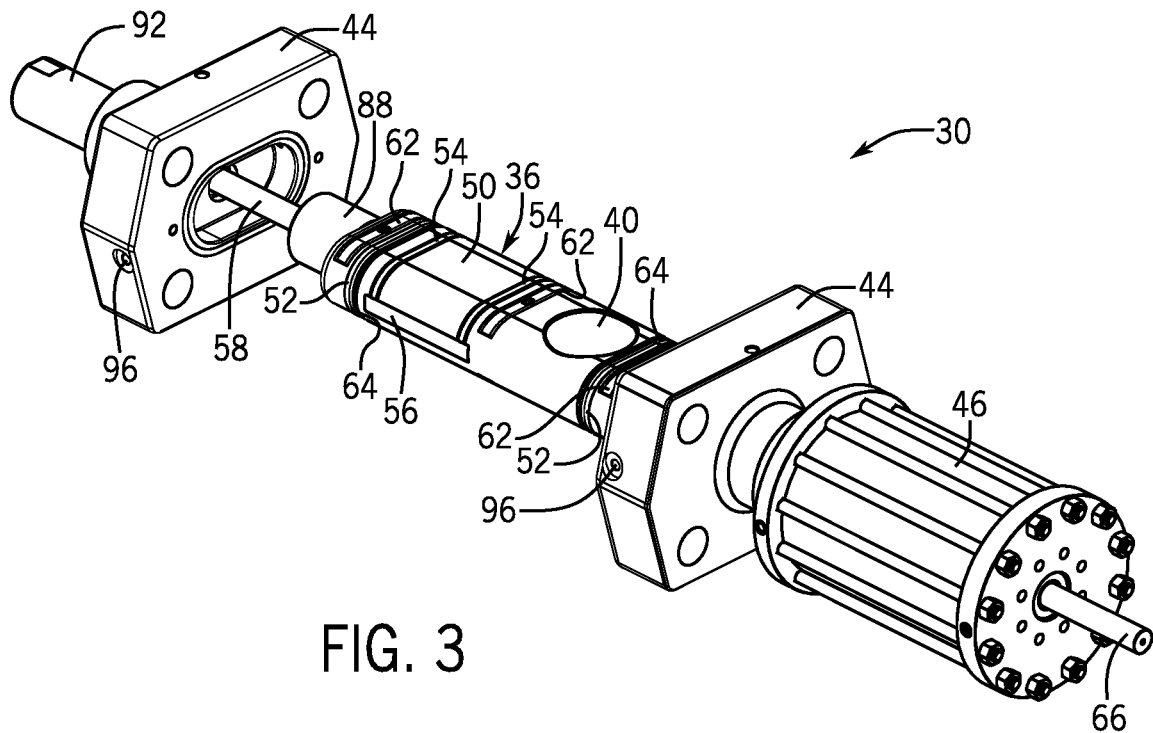
FIG. 3 is a perspective view of the valve of FIG. 2 with a portion of the housing removed to show certain features of the gate in accordance with one embodiment.
Figure 4:
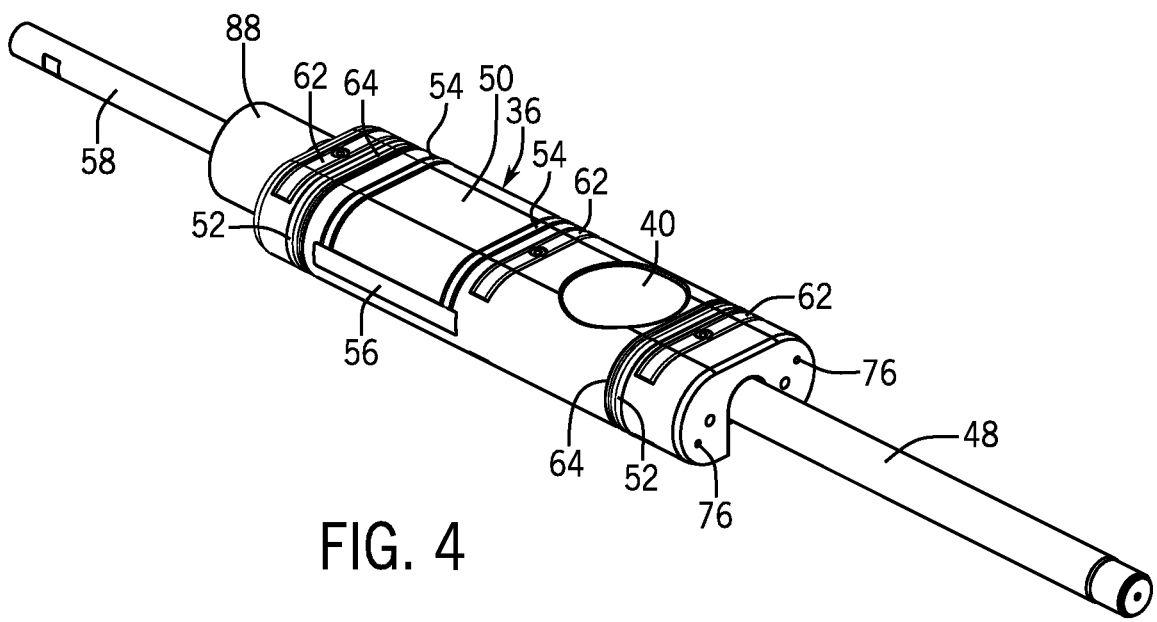
FIG. 4 is a perspective view of the gate of FIG. 3 with an actuation rod and a seal-energizing rod in accordance with one embodiment.
Figure 5:
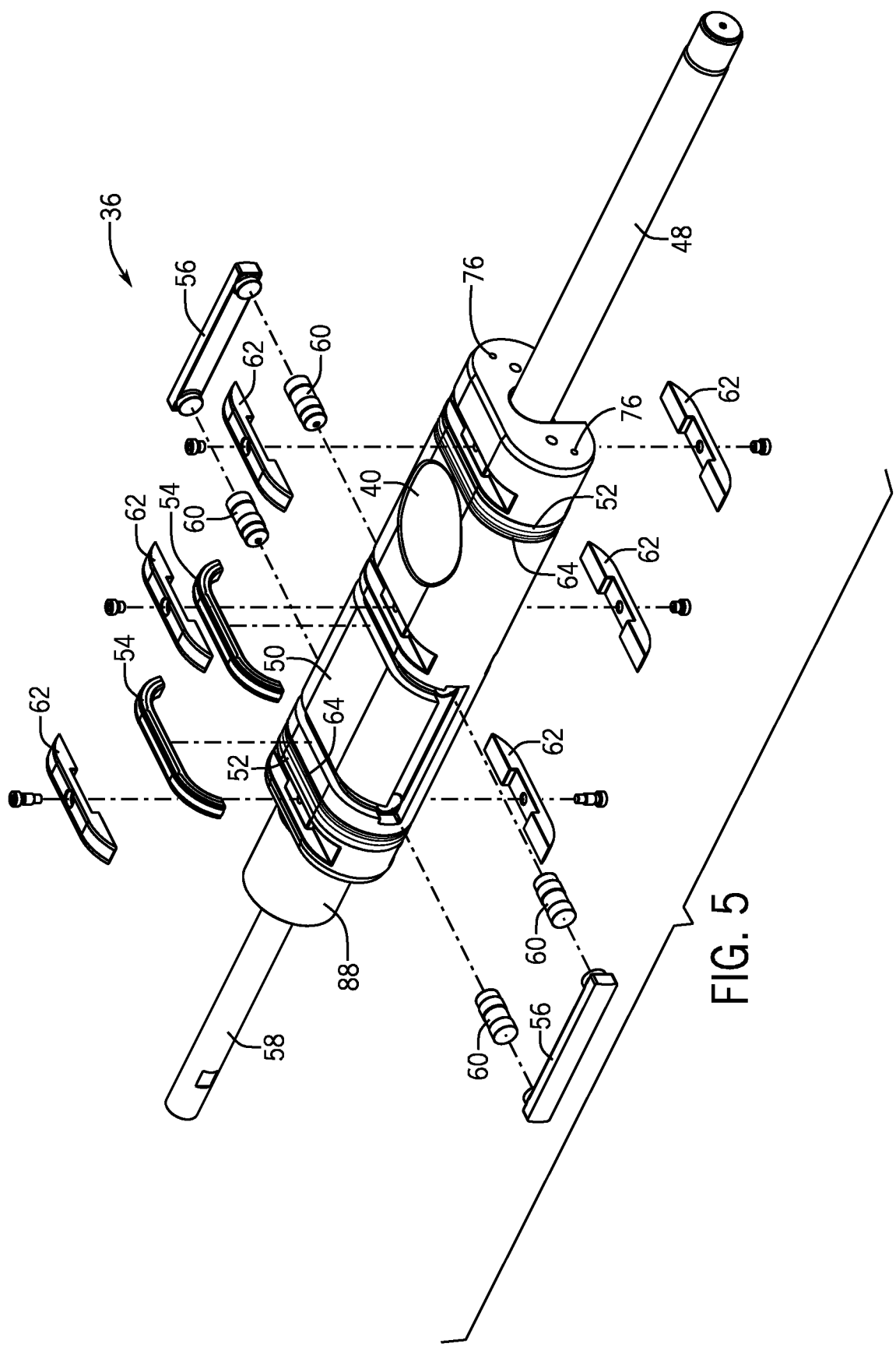
FIG. 5 is an exploded view of the assembly depicted in FIG. 4 in accordance with one embodiment.

Additional features of the gate 36 are depicted in FIGS. 3-5 in accordance with one embodiment. In this example, the gate 36 includes a gate body 50 having the aperture 40 and carrying various seals for sealing between the gate body 50 and a side of the cavity 38. These seals include isolation seals 52 that surround the gate body 50 and isolate ends of the gate 36 from the bore 34, as well as a seal assembly with one or more seals for surrounding the bore and blocking flow through the frac valve 30 when the gate is in the closed position. In the embodiment shown in FIGS. 3-5, this seal assembly for surrounding the bore includes top seals 54 and side seals 56 carried by the gate body 50. As described in further detail below, the top seals 54 and side seals 56 are positioned in recesses of the gate body 50 to seal against the side of the cavity 38 to provide a sealing barrier surrounding the bore 34 within the valve housing. The isolation seals 52 and the one or more seals of the seal assembly (e.g., the top seals 54 and the side seals 56) may be elastomer seals, thermoplastic seals, or formed of any other suitable material. Backing rings may be used next to seals (e.g., the isolation seals 52 and the top seals 54) to reduce extrusion of elastomer or other sealing material of the seals along the gate body 50. In some other instances, backing rings may be molded into the seals as integral pieces.

As shown in FIGS. 3-5, the gate 36 may also include wear pads 62 and wipers 64. During valve operation, the wear pads 62 and the wipers 64 may ride along a sidewall of the cavity 38 as the gate 36 moves between open and closed positions. The wear pads 62 may be formed of or coated with a low-friction material, such as polytetrafluoroethylene (PTFE), to facilitate movement of the gate 36 within the cavity 38. In at least one embodiment, the wear pads 62 are made of a nickel aluminum bronze alloy. The gate 36 may include one or more other wear pads 62 in addition to, or instead of, those shown in FIGS. 3-5. In some embodiments, for example, the gate 36 could include a wear pad 62 positioned on an upper surface of the gate body 50 between the top seals 54 so as to intersect the bore 34 when the gate 36 is in a closed position. The gate 36 could also include a wear pad 62 on a lower surface of the gate body 50, opposite the wear pad 62 on the upper surface between the top seals 54, and also positioned to intersect the bore 34 when the gate 36 is in a closed position. In one embodiment, these wear pads 62 intersecting the bore 34 may span the bore 34 (i.e., these wear pads 62 may be longer than the bore opening, measured in a direction parallel to the direction of movement of the gate 36 between the open and closed positions) and facilitate movement of the gate 36 during operation. The wipers 64 can be formed of any suitable material (e.g., elastomer) and may be used to wipe fracturing fluid particulates (e.g., sand or other proppant) from the sidewall of the cavity 38 to facilitate sealing of the isolation seals 52 against the sidewall.

In some embodiments, the seal assembly for surrounding the bore and blocking flow through the frac valve 30 when the gate 36 is in the closed position is actuatable between a less-energized state and a more-energized state. That is, the sealing pressure of the seal assembly (e.g., of top seals 54 and side seals 56 in FIGS. 3-5) may be varied during use of the valve 30. More specifically, in certain embodiments the seal assembly may be in a less-energized (i.e., more-relaxed) state to facilitate movement of the gate 36 during operation but then placed in a more-energized (i.e., less-relaxed) state when the gate is in the closed position to more tightly seal against the sidewall of the cavity 38. In at least some instances, this actuation includes applying or increasing a force on the seal assembly to increase contact pressure of sealing surfaces of the seal assembly against the sidewall of the cavity 38 to seal around the bore 34. In contrast, the isolation seals 52 are energized at installation and are not actuated between different energy states during valve operation in at least some embodiments.

The frac valve 30 of some embodiments includes a seal-energizing rod 58 that is coupled to actuate the seal assembly between the less-energized state and the more-energized state. As shown by way of example in FIG. 5, the frac valve 30 can also include one or more energizing blocks 60 for transmitting force to the seal assembly from the seal-energizing rod 58 (which may also be referred to as a seal-control rod). Although generally depicted as cylindrical blocks or pins in FIG. 5, the energizing blocks 60 may take any other suitable form. Operation of the seal-energizing rod 58 and the energizing blocks 60 for selectively increasing sealing pressure of the seal assembly against a sidewall of the cavity 38 is described in greater detail below with reference to FIGS. 6-10.

Figure 6:
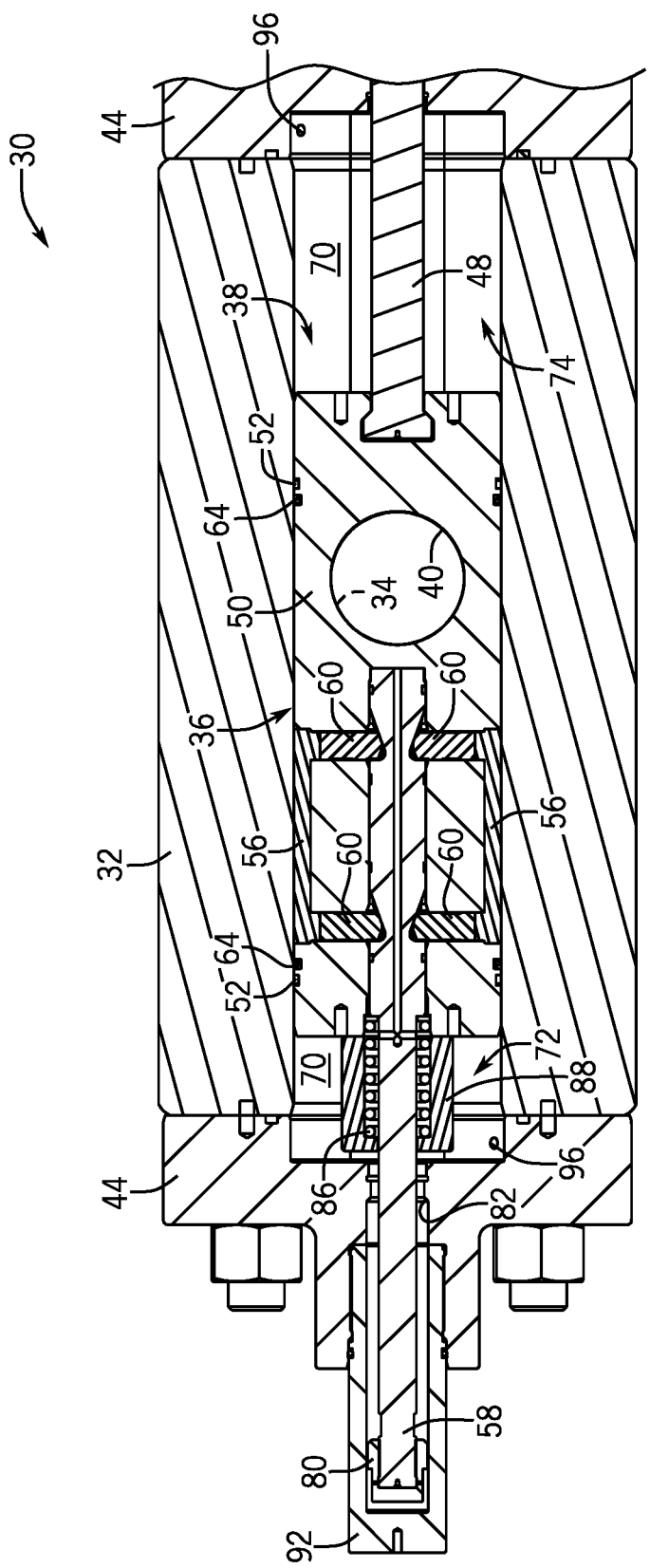
FIG. 6 is a cross-section of the valve of FIG. 2 showing the gate in an open position to allow flow through a bore of the valve in accordance with one embodiment.
Figure 7:
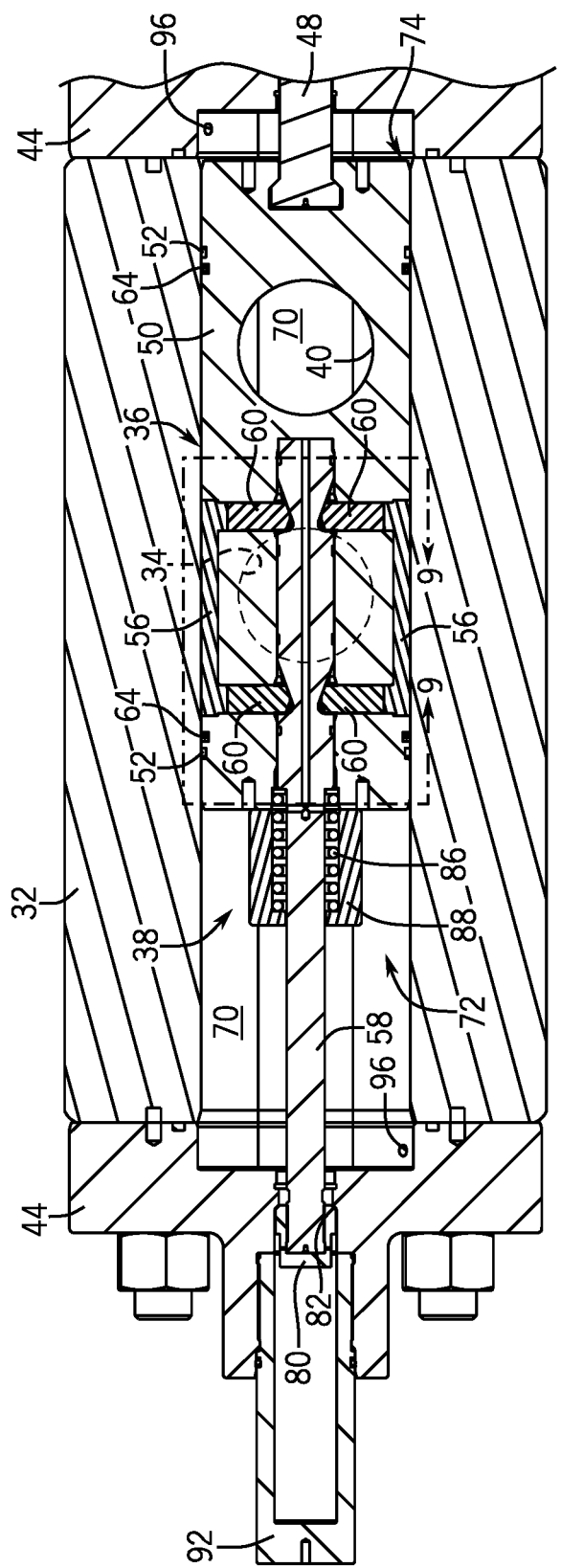
FIG. 7 is a cross-section showing the gate of FIG. 6 moved to a closed position, in which seals of an actuatable seal assembly of the gate surround the bore of the valve, in accordance with one embodiment.
Figure 8:
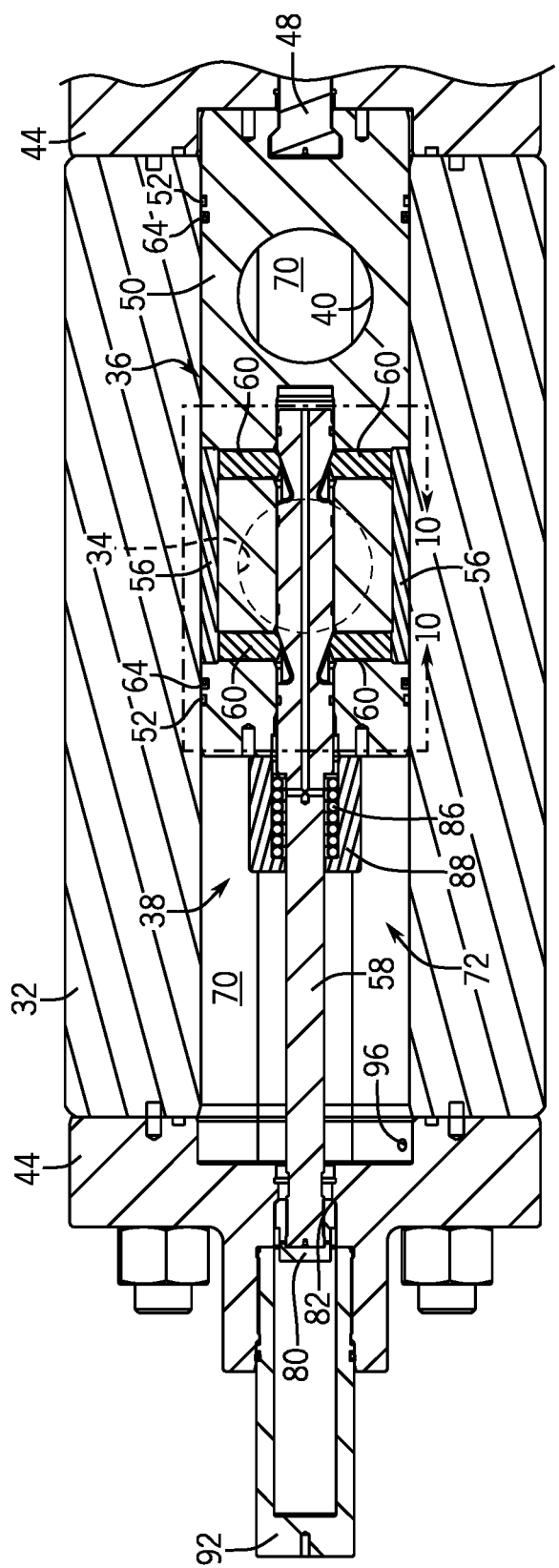
FIG. 8 is a cross-section of the gate of FIG. 7 following actuation of the actuatable seal assembly to a more-energized state to increase sealing contact pressure of seals of the actuatable seal assembly in accordance with one embodiment.

FIGS. 6-8 are axial cross-sections of a portion of the frac valve 30 depicted in FIG. 2 and generally depict positions of the gate 36 during a closing sequence of the frac valve 30. In FIG. 6, the gate 36 is shown in an open position, with the aperture 40 aligned with the bore 34 of the main body 32 to allow flow through the frac valve 30. To close the frac valve 30, the gate 36 can be moved axially (e.g., via the actuator 46 and actuation rod 48) through the transverse cavity 38 from the open position depicted in FIG. 6 to the positions depicted in FIGS. 7 and 8 in which the aperture 40 is removed from the flow path of the bore 34. The gate 36 is supported in the cavity 38 on both sides of the bore 34 in each of these positions, which may reduce tilting of the gate 36 while opening the gate 36 under pressure.

The gate 36 generally separates the cavity 38 into chambers 72 and 74; the chamber 72 is in a first end of the cavity 38 in behind the gate 36 and the chamber 74 is in the opposite end of the cavity 38 in front of the gate 36. It will be appreciated that the volumes of these chambers 72 and 74 vary with movement of the gate 36 through the cavity 38. The isolation seals 52 of the gate 36 seal against a sidewall 70 of the cavity 38 on opposite sides of the bore 34 to isolate the chambers 72 and 74 from the bore 34, generally preventing pressurized fracturing fluid from entering the chambers 72 or 74. This, in turn, prevents pressurized fracturing fluid from acting on either end face of the gate 36 and avoids migration of proppant or other particulates of the fracturing fluid into the stroke pathway in front of or behind the gate 36 within the cavity 38. Accordingly, in some instances the frac valve 30 may be operated without regular greasing.

Figure 11:
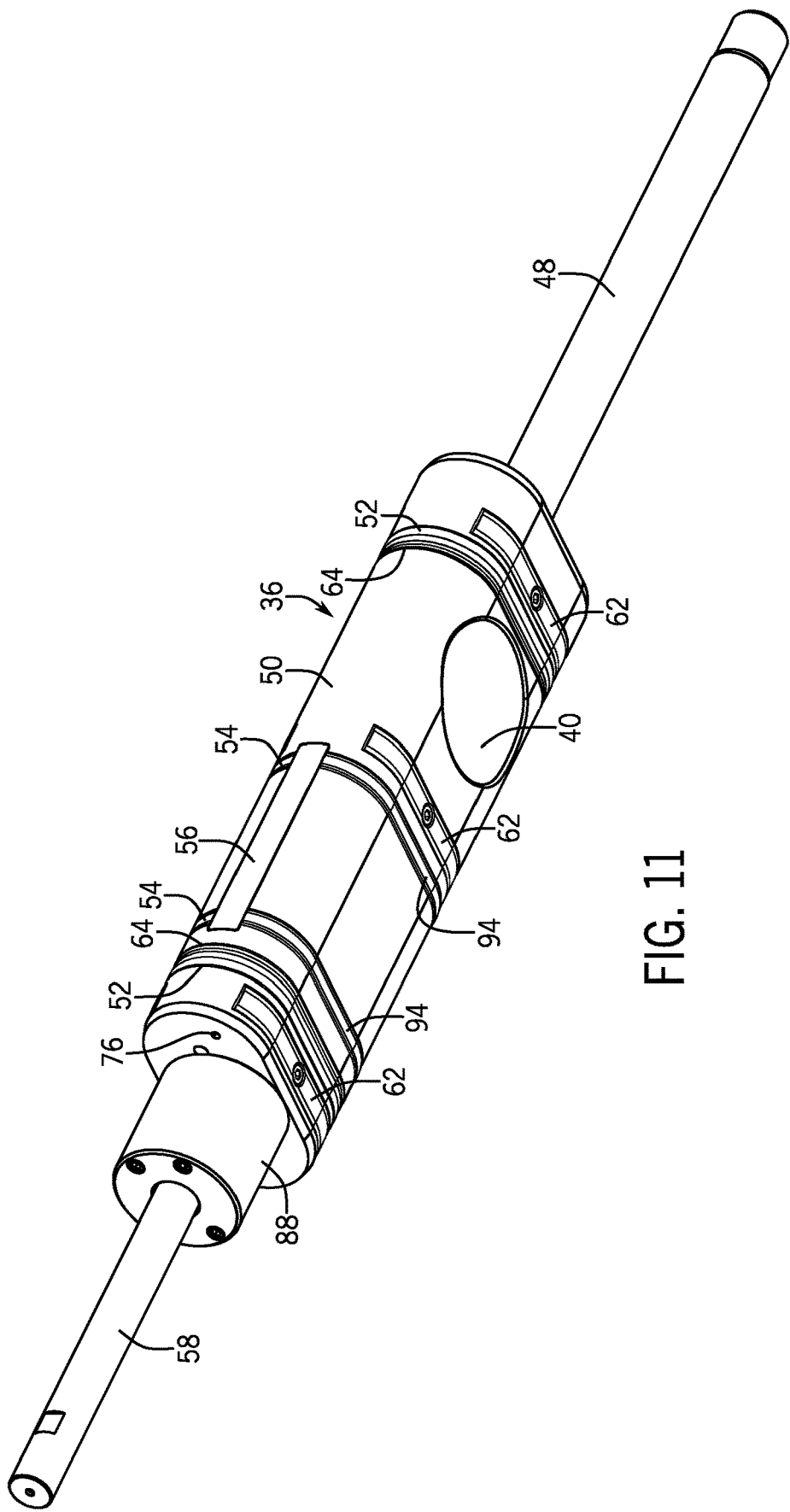
FIG. 11 is a lower perspective view of the assembly depicted in FIG. 4, but with the actuatable seal assembly having bottom seals in addition to the top seals and side seals depicted in FIG. 4, in accordance with one embodiment.

In some embodiments, the chambers 72 and 74 are filled with hydraulic oil or another fluid and are in fluid communication with each other via one or more conduits 76 of the frac valve 30. As shown in FIGS. 4, 5, and 11, for instance, the gate 36 can include internal conduits 76 extending through the gate body 50 (e.g., linear conduits extending from one end face of the gate 36 to the other) to connect the chambers 72 and 74 in fluid communication, allowing pressure equalization between the chambers to avoid hydraulic lock and facilitate movement of the gate 36 within the cavity 38. In other embodiments, one or more internal conduits 76 may also or instead be provided in the housing of the frac valve 30, such as through the main body 32. In still other instances, the frac valve 30 may include an external conduit 76 connected to ports of the frac valve 30 to connect the chambers 72 and 74 in fluid communication.

The gate 36 depicted in FIGS. 6-8 includes an actuatable seal assembly having top seals 54 and side seals 56 for surrounding the bore and blocking flow through the frac valve 30 when the gate 36 is in the closed position. As the gate 36 is moved from the open position of FIG. 6 to the closed position of FIG. 7, a leading seal surface of the seal assembly (e.g., of the top seal 54 closer to the aperture 40) moves transversely across the bore 34 while a trailing seal surface of the seal assembly (e.g., of the top seal 54 further from the aperture 40) remains on one side of the bore 34 in both the open and closed positions. In the closed position, as shown in greater detail in FIG. 9, the top seals 54 and the side seals 56 collectively surround the bore 34, with the top seals 54 straddling the bore 34 in an axial direction and the side seals 56 straddling the bore 34 in a radial direction.

With the gate 36 in the closed position, the seal assembly (e.g., top seals 54 and side seals 56) can be actuated from a less-energized state to a more-energized state to increase contact pressure of the seal assembly within the cavity 38. For instance, in some embodiments the top seals 54 and side seals 56 may be carried by the gate 36 in a more-relaxed state as these seals are moved between the open position and the closed position. By way of example, this more-relaxed state could be a partially-relaxed state (i.e., a partially-energized state) in which the top seals 54 and side seals 56 press against the sidewall 70 or a fully-relaxed state in which these seals do not press against the sidewall 70. The more-relaxed state facilitates movement of the gate 36 between the open and closed positions and may reduce interference between the bore 34 and the leading seal surface moving transversely across the bore 34.

When the seals of the seal assembly surround the bore 34, such as when the gate 36 is in the closed position of FIG. 7, the seal assembly may be actuated to the more-energized state (e.g., fully energized) in which the seal assembly more firmly seals against bore pressure and blocks flow through the frac valve 30. In some embodiments, this actuation is performed through mechanical energization via the seal-energizing rod 58, with movement of the seal-energizing rod 58 relative to the gate 36 causing increased energization of the seal assembly for blocking flow through the valve 30.

In the embodiment depicted in FIGS. 6-10, the seal-energizing rod 58 is received in the gate body 50 and generally travels with the gate 36 as the gate 36 moves from the open position of FIG. 6 to the closed position of FIG. 7. The seal-energizing rod 58 includes a mechanical stop, however, that limits travel of the seal-energizing rod 58 with the gate 36. This mechanical stop is depicted in FIGS. 6-8 as an end cap 80 that may be moved through a hollow end (e.g., a barrel 92) of the valve housing and is stopped by a stop shoulder 82 when the gate 36 reaches the closed position of FIG. 7. From this point, the gate 36 may continue to be moved away from the open position (e.g., rightward from the position of FIG. 7 to that of FIG. 8) while the seal-energizing rod 58 is held in place by the stop shoulder 82.

Figure 9:
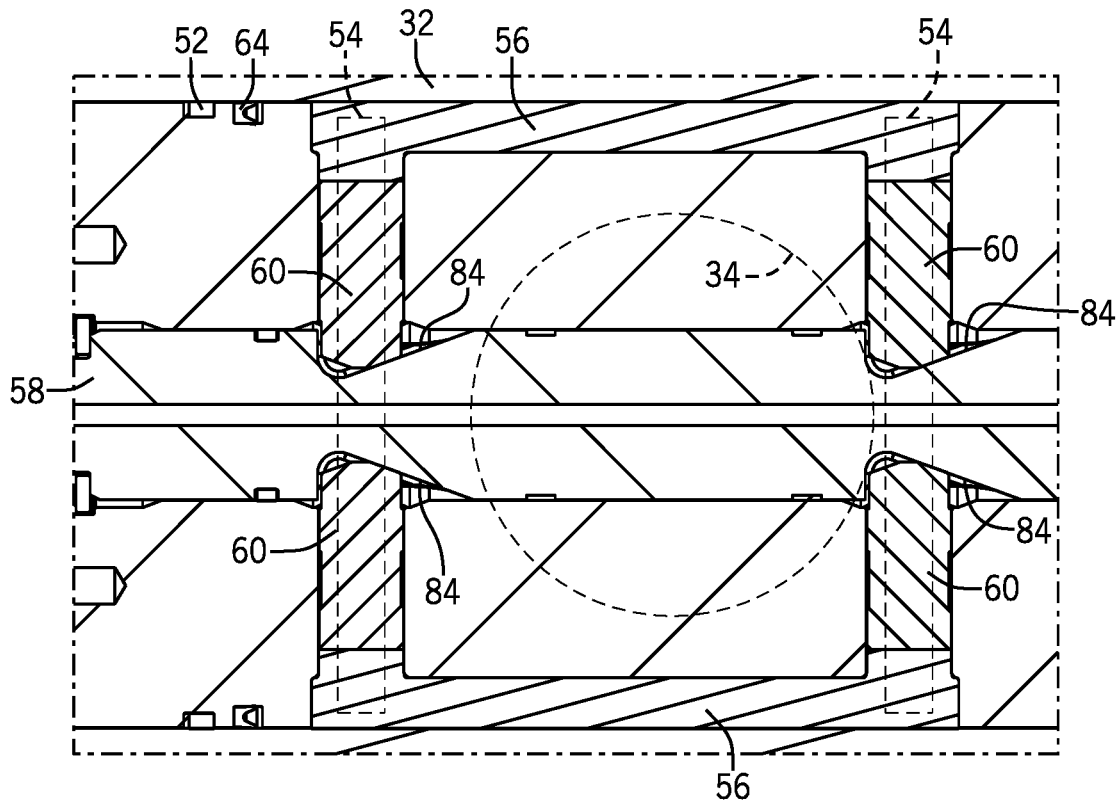
FIG. 9 is a detail view showing energizing blocks in retracted positions within the body of the gate of FIG. 7 in which the actuatable seal assembly is in a less-energized state in accordance with one embodiment.
Figure 10:
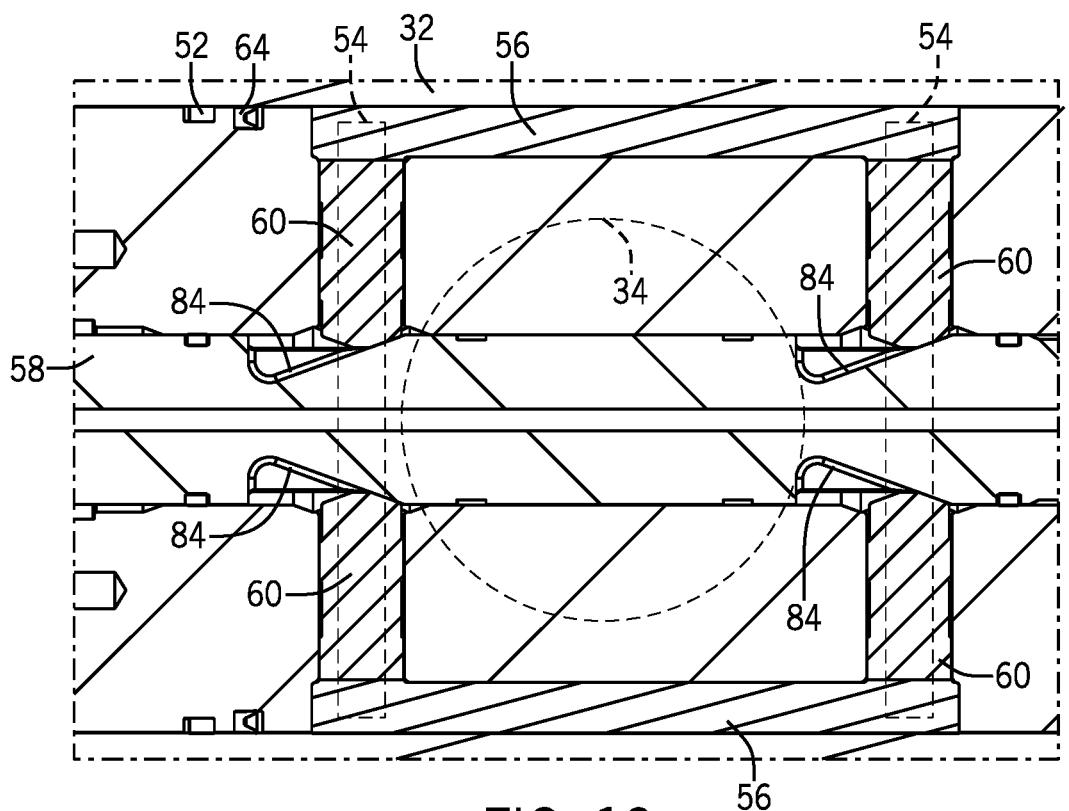
FIG. 10 is a detail view showing the energizing blocks of FIG. 9 in extended positions within the body of the gate of FIG. 8 in which the actuatable seal assembly is in a more-energized state from the energizing blocks pushing outwardly against seals of the actuatable seal assembly in accordance with one embodiment.

As generally shown in FIGS. 9 and 10, this relative movement of the seal-energizing rod 58 with respect to the gate 36 causes the energizing blocks 60 to be drawn up ramped surfaces 84 of the seal-energizing rod 58. The energizing blocks 60 move radially outward within the gate body 50 as they are drawn up the ramped surfaces 84 and compress side seals 56. This increases the sealing contact pressure of the side seals 56 against the sidewall 70 of the cavity 38. In some cases, such as with elastomer side seals 56, the compression of the side seals 56 by the energizing blocks 60 causes the side seals 56 to also press harder against ends of the top seals 54. This, in turn, can increase sealing contact pressure of the top seals 54 against the sidewall 70. The increased sealing contact pressure of the top seals 54 and side seals 56 may help resist bore pressure and prevent flow through the frac valve 30 via the bore 34 when the gate 36 is closed. In some instances, the taper of the ramped surfaces 84 may be self-locking (i.e., the taper angle and coefficient of friction may be such that the energizing blocks 60 drawn up the ramped surfaces 84 may be held in place by friction). While the energizing blocks 60 are arranged to press outwardly against the side seals 56, in other embodiments frac valves 30 may also or instead include energizing blocks 60 arranged to press outwardly against other seals (e.g., the top seals 54).

To open the frac valve 30, the gate 36 may be moved from the position shown in FIG. 8 to that shown in FIG. 7 to actuate the seal assembly (e.g., the top seals 54 and the side seals 56) from the more-energized state to the less-energized state, with this movement (and pressure from the side seals 56) causing the energizing blocks 60 to radially retract as they move along the ramped surfaces 84. From here, the gate 36 may continue to be moved to the open position of FIG. 6. With the gate 36 in the open position, the actuatable seal assembly of the gate 36 is positioned away from the flow path through the bore 34 and the aperture 40, generally protecting the seals of the seal assembly from erosive wear during flow of fluid (e.g., fracturing fluid) through the valve 30.

In at least some embodiments, the frac valve 30 can include a biasing spring 86 (shown in FIGS. 6-8 within a spring housing 88) that helps move the energizing blocks 60 toward their radially retracted positions, such as when the gate 36 moves from the position shown in FIG. 8 to the position shown in FIG. 7. The interior of the spring housing 88 may be in fluid communication with the chamber 72, such as along the seal-energizing rod 58 as it extends axially outward from the housing 88. As shown in FIGS. 6-10, the interior of the spring housing 88 may also be in fluid communication with a space along the end face of the seal-energizing rod 58 within the gate body 50 via a conduit through the seal-energizing rod 58. In some instances, such as when the top seals 54 and the side seals 56 are in a less-energized state, fluid from the bore 34 may enter the gate body 50 along the energizing blocks 60. As shown in FIGS. 6-10, seals may be provided along the seal-energizing rod 58 to maintain isolation and prevent such fluid from entering the chamber 72. Fluid ports 96 in the bonnets 44 facilitate the addition and removal of fluid (e.g., hydraulic oil) from the chambers 72 and 74.

Further, in some embodiments the actuatable seal assembly of the gate 36 includes bottom seals 94, in addition to or instead of the top seals 54, for sealing around the bore 34 when the gate 36 is in the closed position. As shown in FIG. 11, for instance, the actuatable seal assembly of the gate 36 includes bottom seals 94 for sealing against the sidewall 70 of the cavity 38. These bottom seals 94 could differ in structure from the top seals 54, but in at least some embodiments the top seals 54 and the bottom seals 94 are structurally identical. The bottom seals 94 and the side seals 56 may seal against the sidewall 70 and block flow through the bore 34 in the manner described above with respect to the top seals 54. More particularly, the bottom seals 94 in FIG. 11 can be actuated between a less-energized state and a more-energized state in the same manner as the top seals 54 (e.g., via the seal-energizing rod 58, the energizing blocks 60, and the side seals 56).

Figure 12:
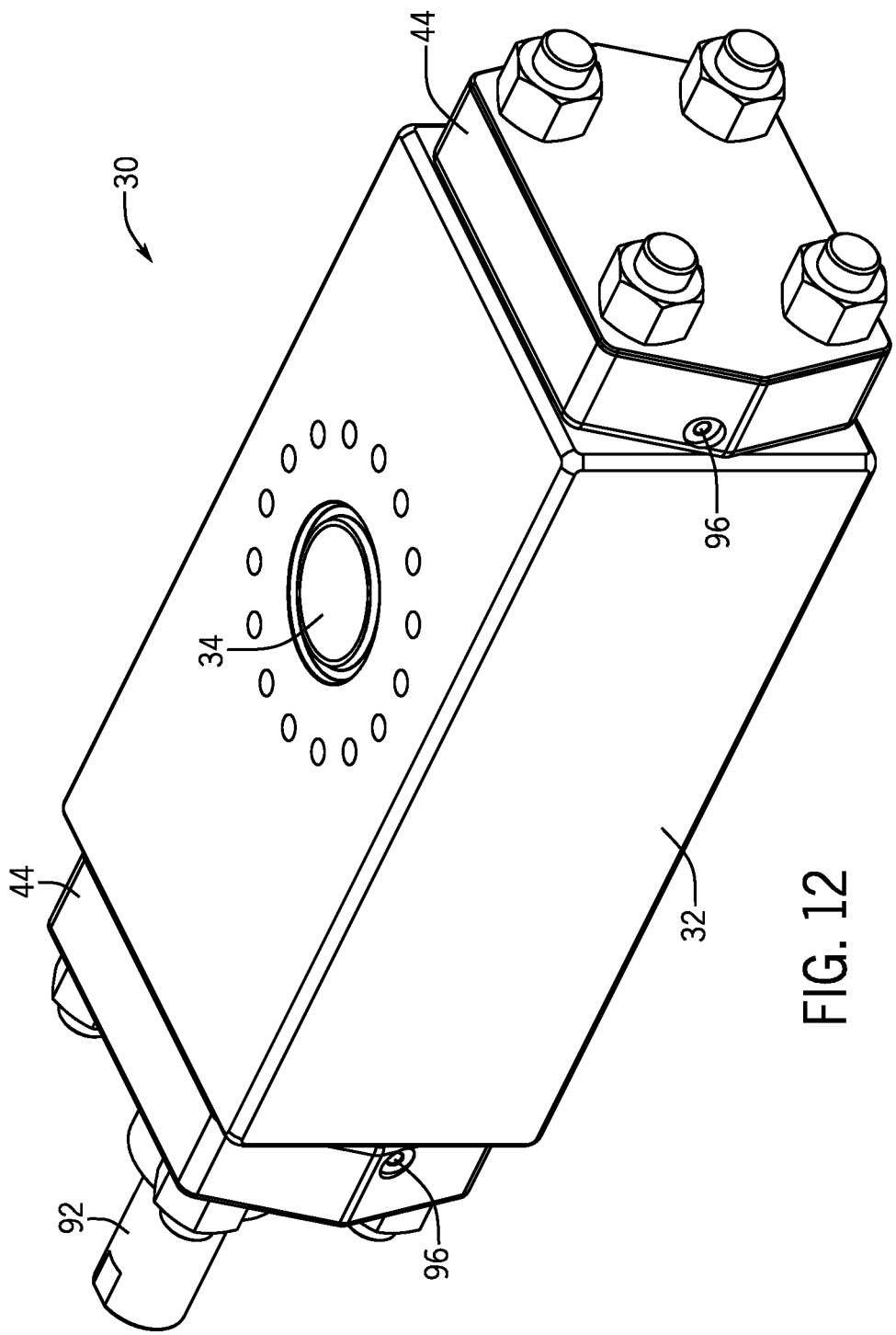
FIG. 12 is a perspective view of a valve like that of FIG. 2, but without an external actuator for moving the internal gate, in accordance with one embodiment.

While an external actuator 46 may be used to drive movement of the gate 36 within the cavity 38, in other embodiments the external actuator 46 may be omitted. One example of this is generally provided in FIG. 12. The frac valve 30 depicted in FIG. 12 is substantially similar to that of FIGS. 2-11 but excludes the external actuator 46 and actuation rod 48. Further, instead of connecting the chambers 72 and 74 in direct fluid communication with one another via a conduit 76, the chambers 72 and 74 of the frac valve 30 depicted in FIG. 12 are isolated from direct communication with one another and the gate 36 can be moved hydraulically by routing control fluid to and from these chambers (e.g., through fluid ports 96). For instance, the gate 36 could be hydraulically driven in one direction by routing control fluid into the chamber 72 and from the chamber 74 to close the gate 36 and actuate the seal assembly to the more-energized state. And the gate 36 could be hydraulically driven in the opposite direction by routing control fluid into the chamber 74 and from the chamber 72 to actuate the seal assembly to the less-energized state and open the gate 36. In some instances, a pump may be connected between the chambers 72 and 74 to draw fluid from one chamber while pumping fluid to the other chamber.

While some examples are given above for actuating a seal assembly of the gate 36 between less-energized and more-energized states to facilitate operation of the valve 30, other techniques for sealing within valves and for actuating seal assemblies between different energy states are envisaged. For instance, in an embodiment depicted in FIGS. 13 and 14, the gate 36 includes a seal assembly that is actuatable between less-energized and more-energized states via a crossbar 102 and plates 104. The actuatable seal assembly is shown as including top seals 54, side seals 56, and bottom seals 94, but the top seals 54 or the bottom seals 94 could be omitted in other embodiments. When installed in the cavity 38 of the frac valve 30, the gate 36 can be moved (e.g., via the actuation rod 48) between open and closed positions with the actuatable seal assembly in a less-energized state, such as described above. During movement of the gate 36 from the open position to the closed position, the top seal 54 and bottom seal 94 closer to the aperture 40 move transversely across the bore 34. When the gate 36 is in the closed position, the seals of the actuatable seal assembly surround the bore 34 and can be actuated to a more-energized state by pushing the crossbar 102 to compress the side seals 56. For instance, the seal-energizing rod 58 can be driven toward the aperture 40 to push the crossbar 102 and plates 104 toward the side seals 56. Compression of the side seals 56 by the plates 104 increases the sealing contact pressure of the side seals 56 against the sidewall 70 and also increases the sealing contact pressure of the top seals 54 and bottom seals 94 (through their contact with the side seals 56) against the sidewall 70. The actuatable seal assembly may be returned to the less-energized state by discontinuing the squeezing pressure applied to the side seals 56 via the seal-energizing rod 58, the crossbar 102, and the plates 104.

The plates 104 are shown fastened to the crossbar 102 but may be removed to facilitate installation (and removal) of the crossbar 102 in a slot 106 of the gate body 50. The axial width of the slot 106 (i.e., measured in the direction of gate movement through the cavity 38) is greater than that of the crossbar 102, allowing axial movement of the crossbar 102 within the slot 106 to actuate the seal assembly between the less-energized and more-energized states. The seal-energizing rod 58 can be driven in any suitable manner, such as with an additional actuator 46. The gate 36 depicted in FIGS. 13 and 14 includes isolation seals 52. As described above, the seals 52, 54, 56, and 94 can be formed of any suitable materials, but in at least one instance the seals 52, 54, 56, and 94 are elastomer seals. It will be appreciated that the gate 36 depicted in FIGS. 13 and 14 could also include other features, such as wear pads 62, wipers 64, or conduits 76 described above.

Figure 15:
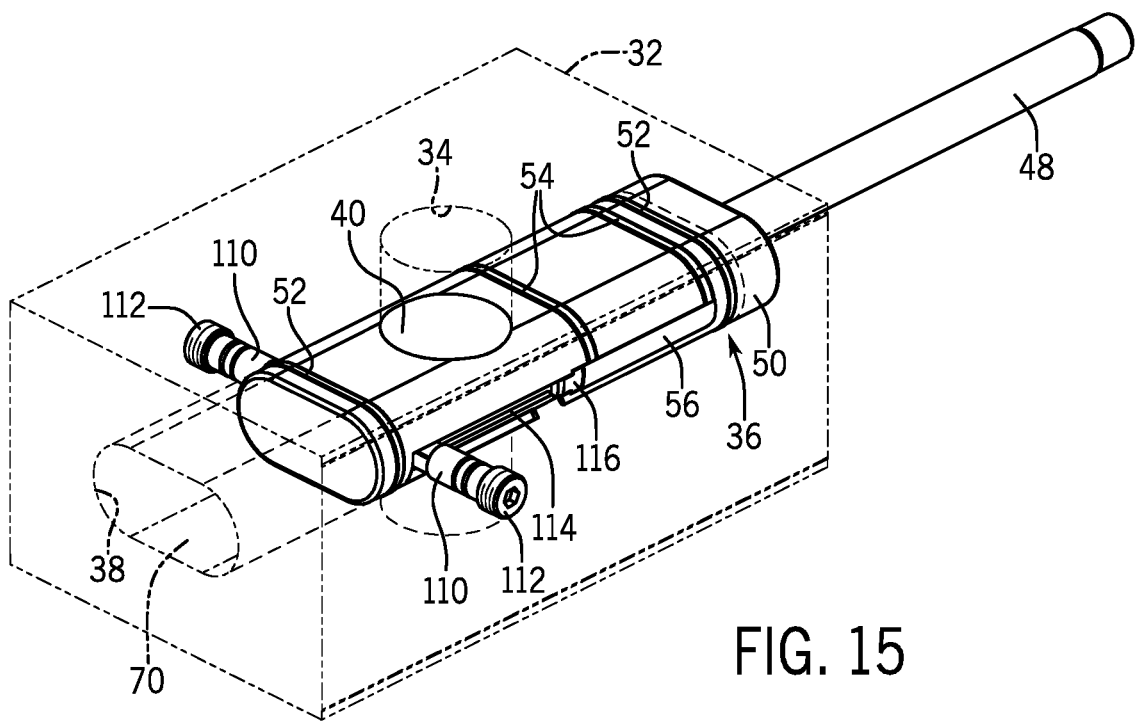
FIG. 15 is a perspective view of a gate in an open position to allow flow through the valve, in which the gate includes a seal assembly actuatable via stop segments installed in a valve housing in accordance with one embodiment.
Figure 16:
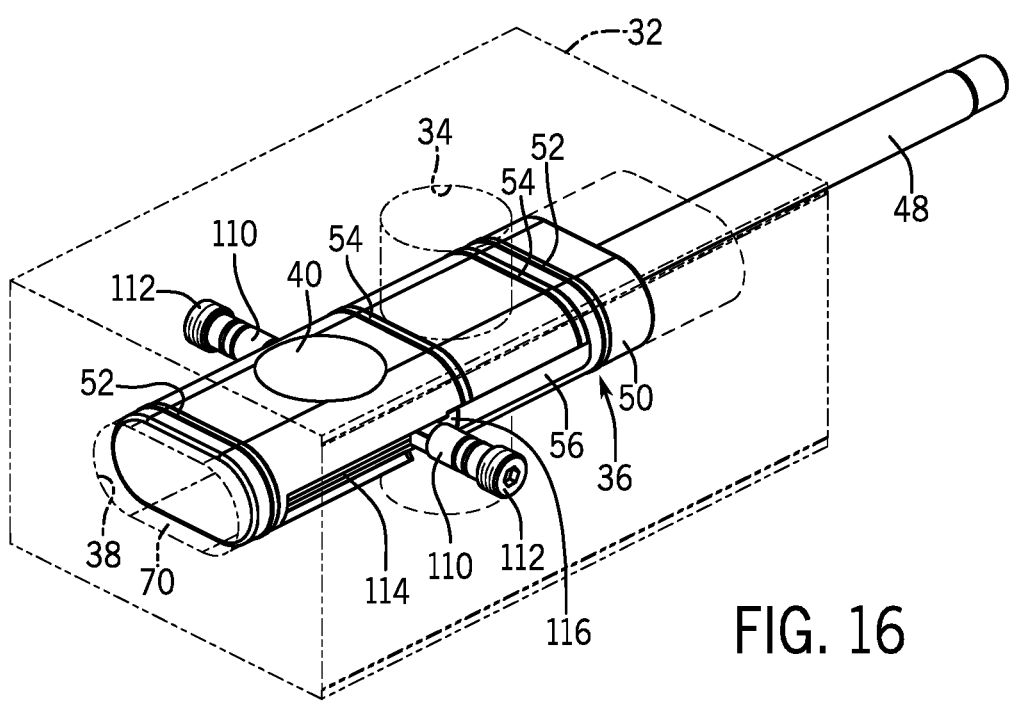
FIG. 16 shows the gate of FIG. 15 moved to a closed position at which the stop segments may be used to actuate the seal assembly to a more-energized state in accordance with one embodiment.
Figure 17:
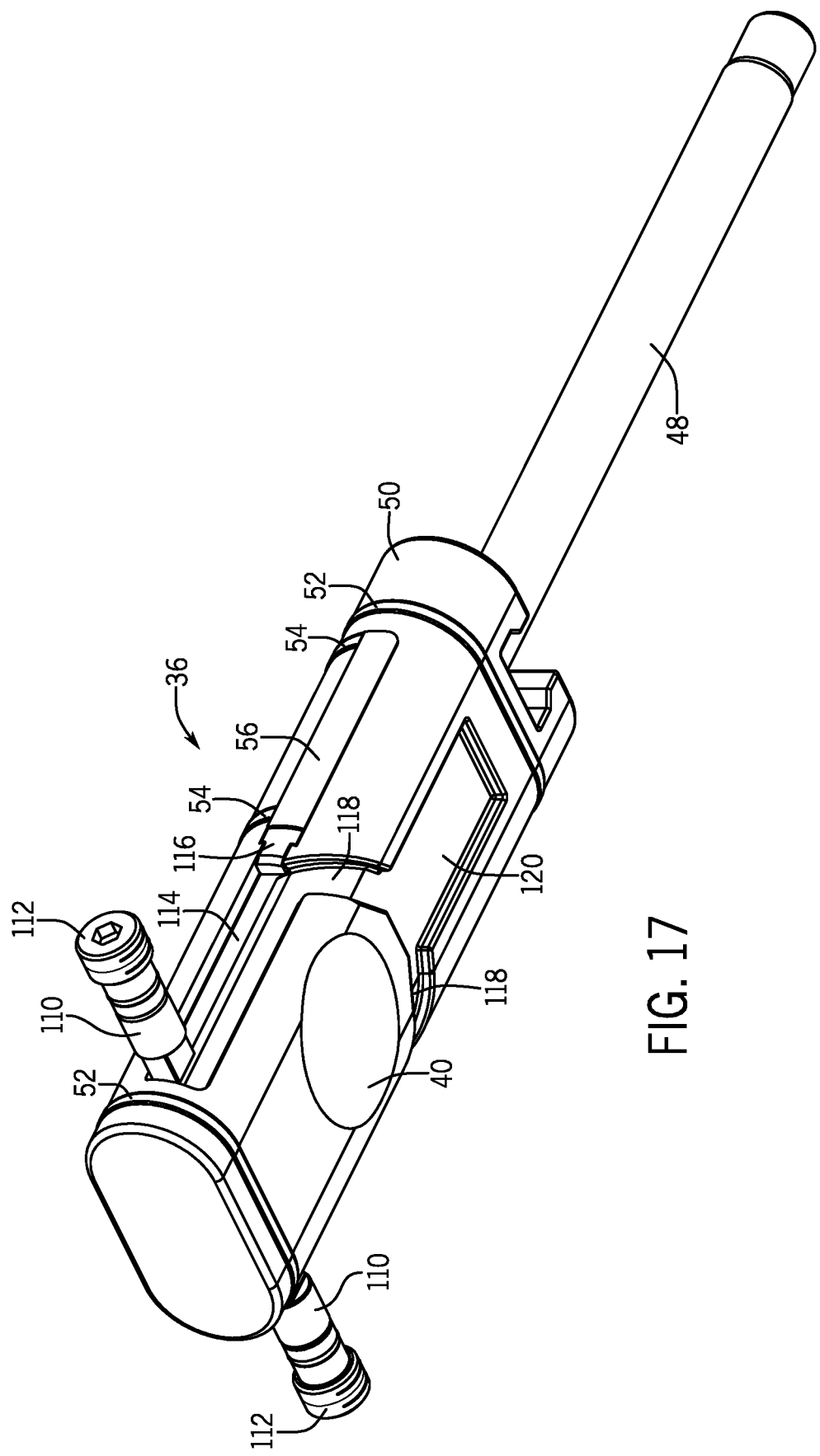
FIG. 17 is a lower perspective view of the gate of FIGS. 15 and 16 in accordance with one embodiment.

In another embodiment depicted in FIGS. 15-17, the gate 36 includes a seal assembly that is actuatable between less-energized and more-energized states via stop segments (e.g., pins) 110 extending into the cavity 38. The actuatable seal assembly is shown in FIGS. 15-17 as having top seals 54 and side seals 56. A portion of the valve housing (specifically main body 32) is shown in phantom in FIGS. 15 and 16 for reference purposes, and the stop segments 110 may be installed in the main body 32 such that ends of the segments 110 protrude into receiving slots 114 along the gate body 50. In the depicted embodiment, the stop segments 110 may be installed through side ports of the main body 32 and plugs 112 may be installed behind the segments 110 to retain the stop segments 110 and seal the side ports. Like other embodiments described above, the gate 36 can be moved (e.g., via the actuation rod 48) between an open position (FIG. 15) for allowing flow through the bore 34 and aperture 40 and a closed position (FIG. 16) for blocking such flow. As the gate 36 moves from the open position to the closed position, the top seal 54 closer to the aperture 40 moves transversely across the bore. The actuatable seal assembly may be carried in a less-energized state when the gate 36 is in the open position or is traveling between the open position and the closed position. But when moved to the closed position, the seals of the seal assembly surround the bore 34 and may be actuated from the less-energized state to the more-energized state by pushing the gate 36 such that the side seals 56 are compressed between the stop segments 110 and the gate body 50. This compression increases the sealing contact pressure of the side seals 56 and of the top seals 54 against the sidewall 70 of the frac valve 30, as described above. This actuatable seal assembly may be returned to the less-energized state by ceasing to push the gate 36 against the stop segments 110.

In FIGS. 15-17, the gate 36 includes compression plates 116 positioned in the slots 114 next to the side seals 56. When the gate 36 is moved to the closed position, continued closing force applied to the gate 36 causes the stop segments 110 to bear against the compression plates 116, pushing the plates 116 against ends of the side seals 56 and increasing energization of the side seals 56 and the top seals 54. But in other instances, these plates 116 could be omitted and the stop segments 110 may press directly against the side seals 56.

When the gate 36 is in the open position, some fluid passing through the frac valve 30 may flow around the outside of the gate body 50 into the slots 114. Sand or other particulates in the fluid may be deposited in the slots 114. The gate 36 is shown in FIG. 17 as having recessed flow paths 118 between the slots 114 and a recessed portion 120 on the underside of the gate body 50. As the gate 36 is moved to the closed position, some particulates deposited in the slots 114 may be pushed by the stop segments 110 and the flow paths 118 allow particulates to flow from the slots 114 into the recessed portion 120 for accumulation and discharge. The recessed portion 120 may be positioned such that accumulated particulates within the recessed portion 120 are pushed into the bore 34 of main body 32 as the gate 36 moves to the closed position. The gate 36 in FIGS. 15-17 includes isolation seals 52, such as described above. Again, the seals 52, 54, and 56 can be formed of any suitable materials, but these are elastomer seals in at least one instance. And the gate 36 of FIGS. 15-17 could include other features, such as wear pads 62, wipers 64, or conduits 76 described above.

Figure 18:
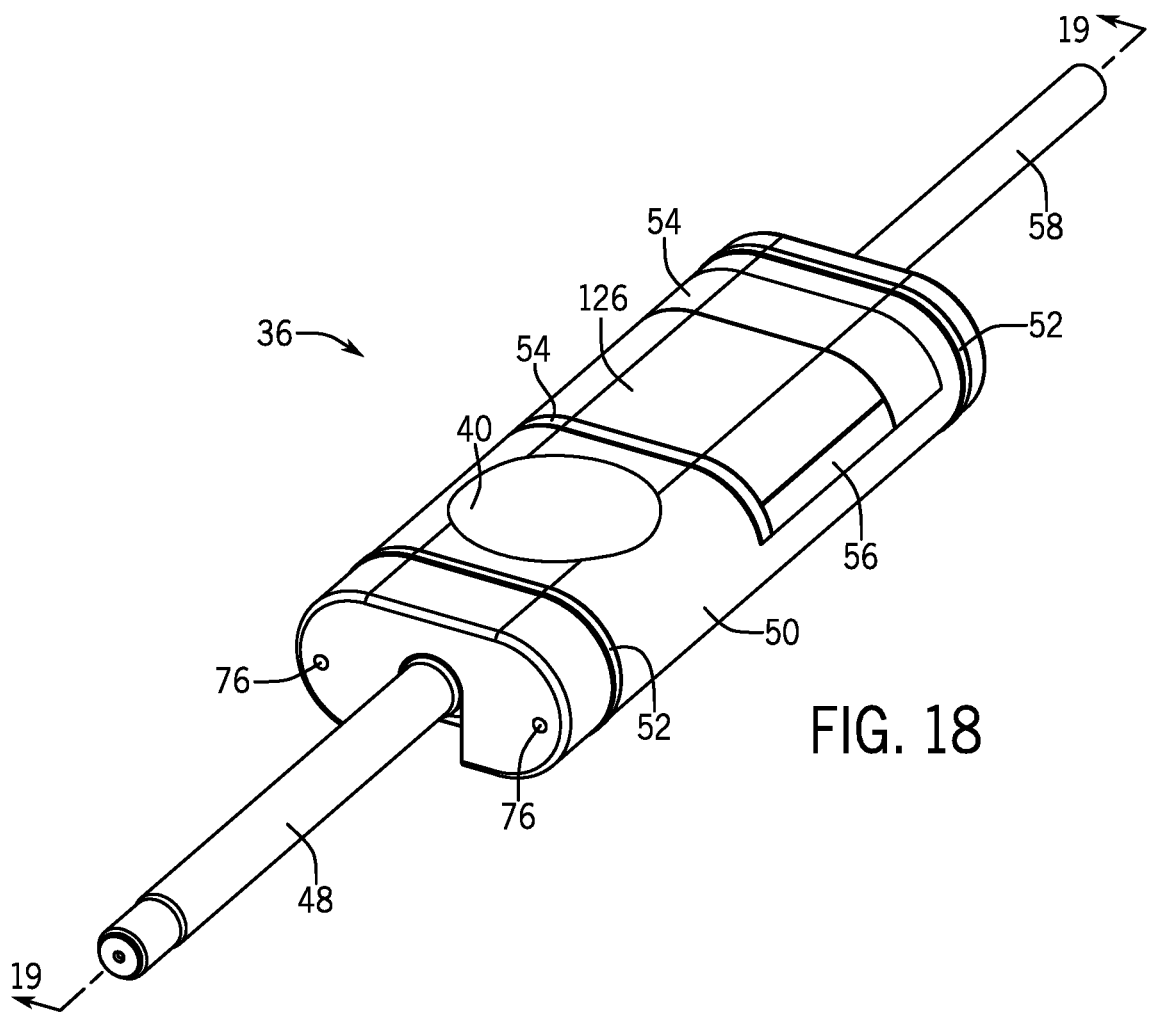
FIG. 18 is a perspective view of a gate that may be used to control flow through the valve, with the gate having a crossbar and an insert installed in an upper cavity of the gate for actuating a seal assembly, in accordance with one embodiment.
Figure 19:
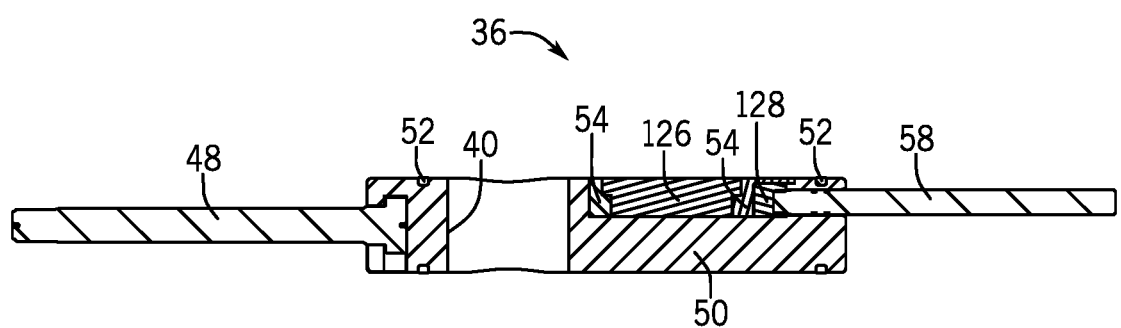
FIG. 19 is a cross-section of the gate of FIG. 18, with an actuation rod and a seal-energizing rod, in accordance with one embodiment.

In an embodiment depicted in FIGS. 18 and 19, the gate 36 includes a seal assembly, with top seals 54 and side seals 56, that is actuatable between less-energized and more-energized states via a crossbar 128 and an insert 126 that is positioned between the top seals 54. As with other gates 36 described above, the gate 36 of FIGS. 18 and 19 can be moved (e.g., via the actuation rod 48) through the cavity 38 between open and closed positions with the actuatable seal assembly in a less-energized state. During movement of the gate 36 from the open position to the closed position, the top seal 54 closer to the aperture 40 moves transversely across the bore 34. When the gate 36 is in the closed position, the insert 126 is aligned with the bore 34, and the top seals 54 and side seals 56 collectively surround the bore 34. This seal assembly can be actuated to a more-energized state by pushing the crossbar 128 (e.g., via the seal-energizing rod 58) to squeeze the seal assembly between the crossbar 128 and the gate body 50. That is, the seal-energizing rod 58 can push a top seal 54 against the insert 126, which moves with respect to the gate body 50 and pushes against the other top seal 54. This compresses the top seals 54, as well as the two side seals 56 positioned between the top seals 54, increasing sealing contact pressure of the top seals 54 and side seals 56 against the sidewall 70 of the cavity 38. In some embodiments, the seal-energizing rod 58 is driven by an actuator 46 that is separate from any actuator 46 used to drive movement of the gate 36 via the actuation rod 48. The actuatable seal assembly may be returned to the less-energized state by discontinuing the squeezing pressure applied by the crossbar 128. The gate 36 of FIGS. 18 and 19 includes isolation seals 52, such as described above, and the seals 52, 54, and 56 are elastomer seals in at least one embodiment but could be formed of any other suitable materials. Further, this gate 36 could include other features, such as wear pads 62, wipers 64, or conduits 76 described above.

Figure 20:
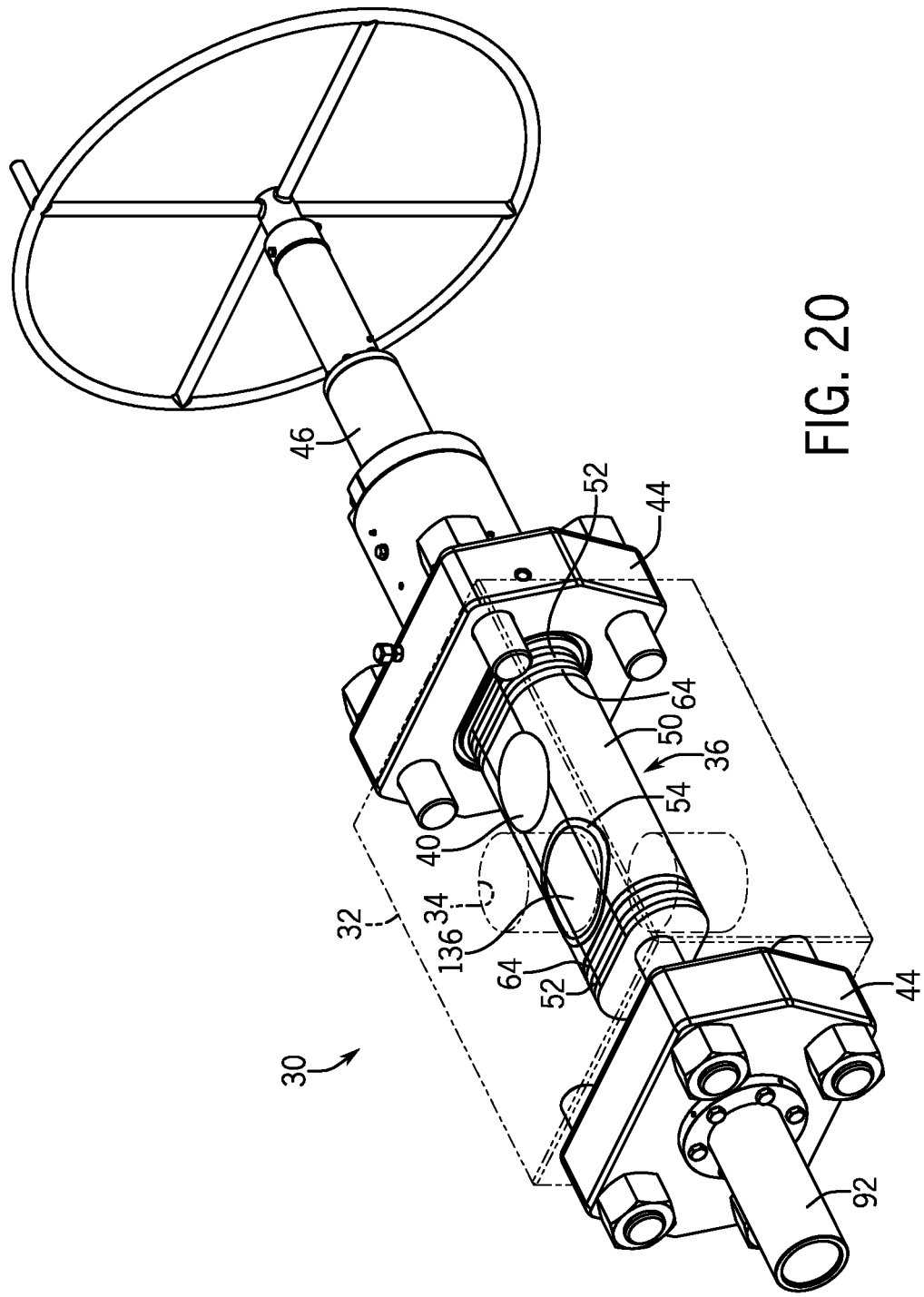
FIG. 20 is a perspective view of a valve having a gate installed in a cavity of a housing, in which the gate includes an actuatable seal assembly having a top seal positioned on a seal carrier, in accordance with one embodiment.
Figure 21:
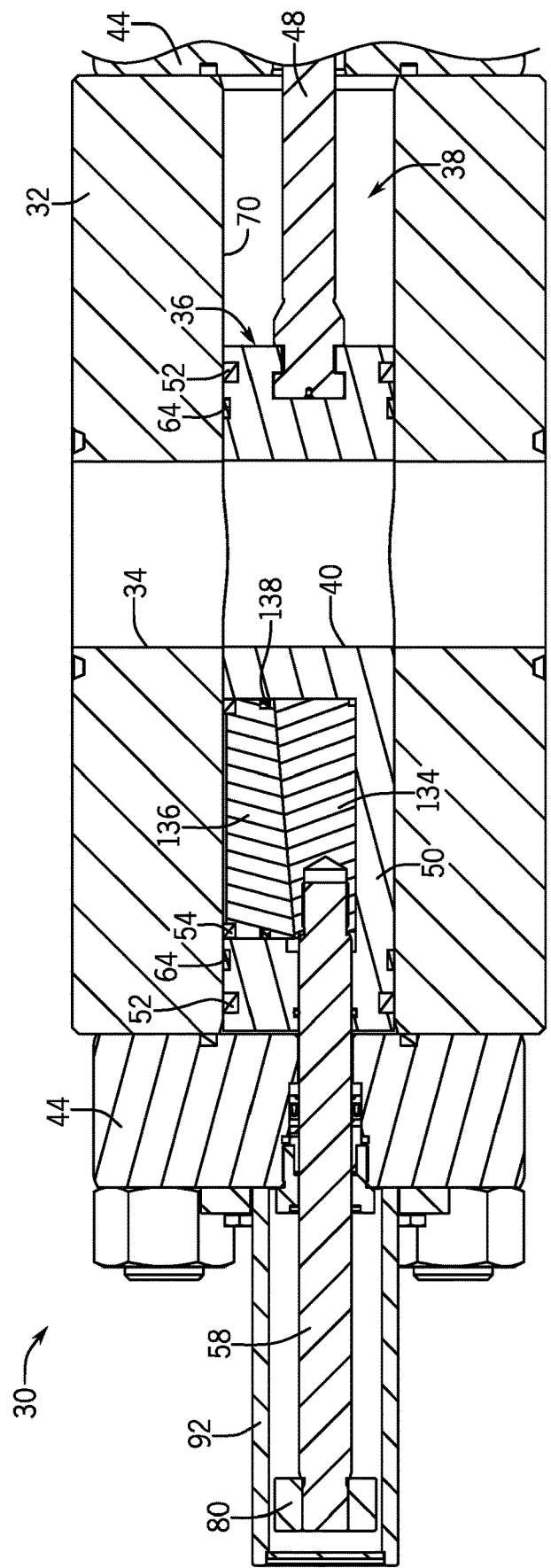
FIG. 21 is a cross-section of the valve of FIG. 20 and shows the gate in an open position with the seal carrier positioned on an actuation wedge within the gate in accordance with one embodiment.
Figure 22:
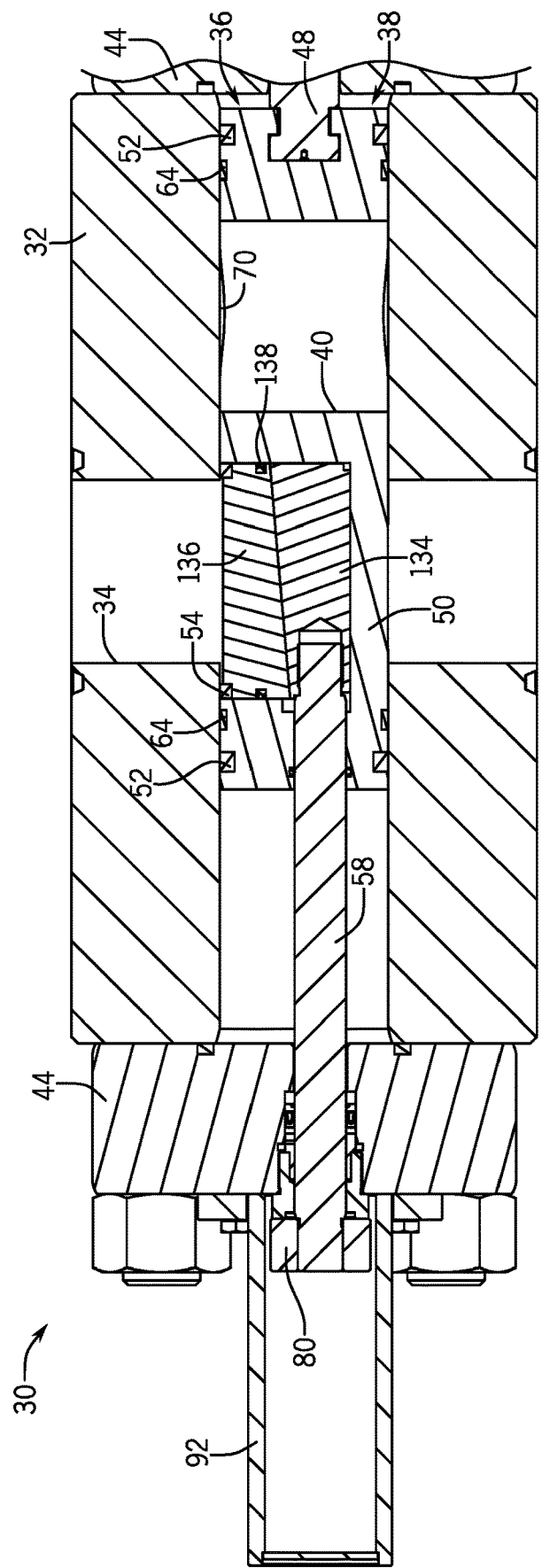
FIG. 22 is a cross-section showing the gate of FIG. 21 having been moved to a closed position in which the top seal encircles the bore of the valve in accordance with one embodiment.

In still another embodiment depicted in FIGS. 20-23, the gate 36 includes a seal assembly that has a top seal 54, a seal carrier 136, and a wedge 134 and that is actuatable between less-energized and more-energized states through movement of the wedge 134 with respect to the seal carrier 136. In FIG. 20, the gate 36 is shown having a single, circular top seal 54 carried by the gate 36 on the seal carrier 136. The depicted gate 36 includes isolation seals 52 to isolate the ends of the gate 36 from the bore 34. The seals 52 and 54 may be elastomer seals or formed of any other suitable materials. The gate 36 is shown in FIGS. 20-23 as having wipers 64, but may also or instead include other features, such as wear pads 62 or conduits 76.

Figure 23:
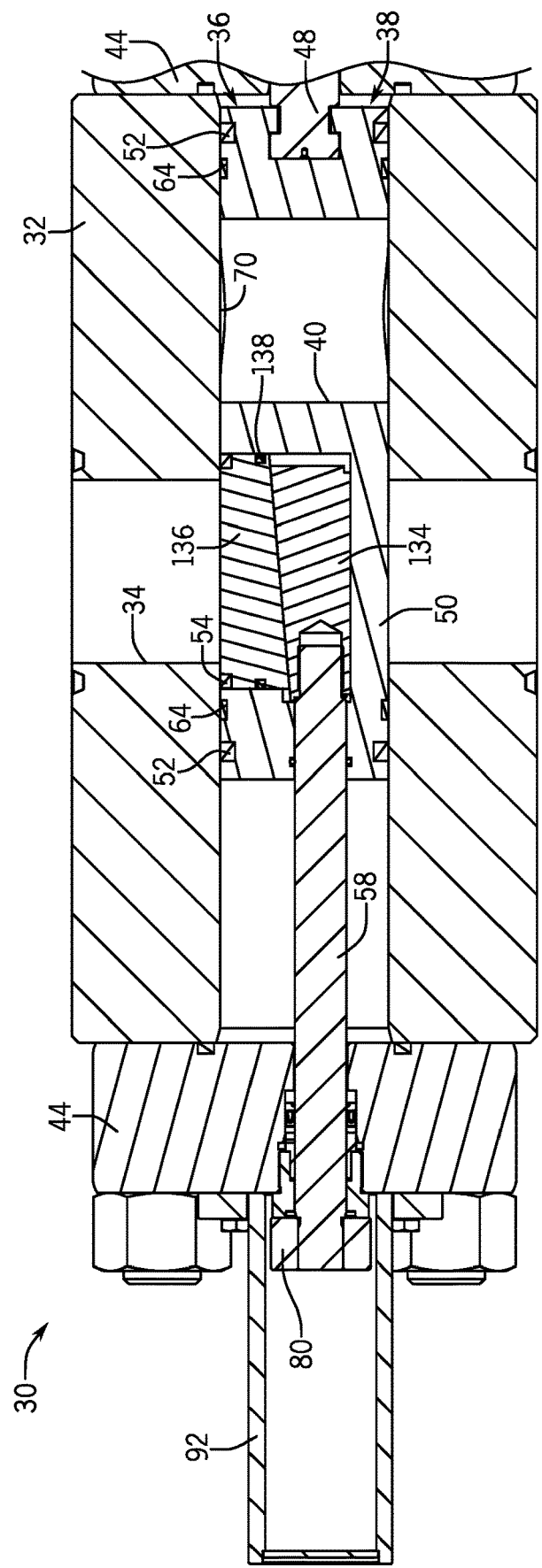
FIG. 23 is a cross-section showing the gate of FIG. 22 having been moved further to draw the seal carrier up along a tapered interface with the actuation wedge to compress the top seal against a sidewall of the cavity in accordance with one embodiment.

Like other gates 36 described above, the gate 36 of FIGS. 20-23 can be moved (e.g., via the actuation rod 48) between open and closed positions with the actuatable seal assembly in a less-energized state. The frac valve 30 is shown in an open position in FIG. 21 and a closed position in FIG. 22. The wedge 134 and the seal carrier 136 share a tapered interface to facilitate actuation of the seal assembly between the less-energized and more-energized states. As the gate 36 is moved from the open position of FIG. 21 to the closed position of FIG. 22, a leading portion of the top seal 54 (i.e., a leading seal surface) moves transversely across the bore 34 while a trailing portion of the top seal 54 (i.e., a trailing seal surface) remains to one side of the bore 34. In the closed position, the top seal 54 surrounds the bore 34. The seal-energizing rod 58 travels with the gate 36 to the closed position. The end cap 80 prevents further movement of the seal-energizing rod 58 with the gate 36 in the closing direction, however, and continued movement of the gate 36 in that direction actuates the seal assembly to the more-energized state by causing the seal carrier 136 to ride along the tapered interface with the wedge 134 and compress the top seal 54 between the sidewall 70 and the seal carrier 136, as shown in FIG. 23. In some instances, the tapered interface of the wedge 134 and the seal carrier 136 can be a self-locking interface able to hold the seal carrier 136 in the closed position by friction. The actuatable seal assembly may be returned to the less-energized state by moving the gate 36 in the opposite direction to reduce compression of the top seal 54 and allow the seal carrier 136 to ride back down the tapered interface with the wedge 134. The presently depicted gate 36 also includes a seal 138 to block fluid that may enter into the gate body 50 past the top seal 54 (e.g., when the top seal 54 is in the less-energized state).

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of controlling flow of fracturing fluid in a fracturing apparatus, the method comprising:
routing the fracturing fluid into a frac valve of the fracturing apparatus, the frac valve including: a housing having a bore to convey the fracturing fluid and a cavity that is transverse to the bore; a gate positioned in the cavity, wherein the gate is movable within the cavity between an open position and a closed position and has an aperture that allows the fracturing fluid to flow through the frac valve via the bore and the aperture when the gate is in the open position; a first chamber positioned within the cavity behind the gate, the first chamber isolated from the bore; and a second chamber positioned within the cavity in front of the gate, the second chamber isolated from the bore; and
closing the frac valve to block flow of the fracturing fluid through the valve, wherein closing the frac valve includes:
moving the gate toward the closed position; and
then actuating a seal assembly of the gate, the seal assembly having one or more seals, so as to cause the seal assembly to more tightly seal against a sidewall of the cavity to surround the bore and block flow through the frac valve.

2. The method of claim 1, wherein actuating the seal assembly of the gate includes causing movement of a seal-energizing rod relative to the gate to increase pressure of the seal assembly against the sidewall of the cavity.

3. The method of claim 2, wherein causing movement of a seal-energizing rod relative to the gate to increase pressure of the seal assembly against the sidewall of the cavity includes holding the seal-energizing rod in a fixed position while moving the gate to increase pressure of the seal assembly against the sidewall of the cavity.

4. The method of claim 1, comprising opening the frac valve to allow flow of the fracturing fluid through the valve, wherein opening the frac valve includes:
reducing sealing pressure of the seal assembly against the sidewall; and
then moving the gate to the open position.

5. A fracturing apparatus comprising:
a frac valve to control flow of fracturing fluid through the frac valve, the frac valve comprising:
a housing having a bore to convey the fracturing fluid and a cavity that is transverse to the bore;
a gate positioned in the cavity;
a first chamber positioned within the cavity behind the gate, the first chamber isolated from the bore; and
a second chamber positioned within the cavity in front of the gate, the second chamber isolated from the bore;
wherein:
the gate is movable within the cavity between an open position and a closed position and has an aperture that allows the fracturing fluid to flow through the frac valve via the bore and the aperture when the gate is in the open position;
the gate has a seal assembly having one or more seals, the seal assembly including a leading seal surface that is positioned to move transversely across the bore as the gate moves within the cavity from the open position to the closed position and a trailing seal surface that does not move across the bore as the gate moves within the cavity from the open position to the closed position;
the seal assembly is positioned to seal against a sidewall of the cavity to surround the bore and block flow through the frac valve when the gate is in the closed position; and
the seal assembly is actuatable between a less-energized state and a more-energized state following movement of the gate within the cavity from the open position to the closed position.

6. The fracturing apparatus of claim 5, wherein the first chamber is isolated from the bore by a first additional seal positioned to seal between the gate and the sidewall of the cavity to one side of the bore and the second chamber is isolated from the bore by a second additional seal positioned to seal between the gate and the sidewall of the cavity to an opposite side of the bore.

7. The fracturing apparatus of claim 6, wherein the first additional seal, the second additional seal, and the one or more seals of the seal assembly of the gate are elastomer seals.

8. The fracturing apparatus of claim 6, wherein the first additional seal and the second additional seal surround, and are carried by, the gate.

9. The fracturing apparatus of claim 5, wherein the first chamber behind the gate and the second chamber in front of the gate are in fluid communication with each other via an internal conduit.

10. The fracturing apparatus of claim 9, wherein the internal conduit extends through the gate.

11. The fracturing apparatus of claim 5, comprising an actuator coupled to the gate via an actuation rod to move the gate between the open position and the closed position.

12. The fracturing apparatus of claim 5, comprising a seal-energizing rod coupled to actuate the seal assembly between the less-energized state and the more-energized state.

13. The fracturing apparatus of claim 12, wherein the seal-energizing rod is coupled to actuate the seal assembly between the less-energized state and the more-energized state by increasing sealing pressure of the leading seal surface and of the trailing seal surface of the seal assembly following movement of the gate within the cavity from the open position to the closed position.

14. The fracturing apparatus of claim 12, wherein the seal-energizing rod extends into the gate.

15. The fracturing apparatus of claim 14, comprising an energizing block received in a body of the gate so as to extend outward from the seal-energizing rod toward the seal assembly.

16. The fracturing apparatus of claim 15, wherein the energizing block is received by an outward-facing ramped surface of the seal-energizing rod such that movement of the seal-energizing rod relative to the body of the gate causes movement of the energizing block to increase or decrease energization of the seal assembly.

17. The fracturing apparatus of claim 5, wherein the one or more seals of the seal assembly include a first seal having the leading seal surface and a second seal having the trailing seal surface.

18. The fracturing apparatus of claim 5, comprising a wellhead assembly having the frac valve.

19. A fracturing apparatus comprising:
a frac valve to control flow of fracturing fluid through the frac valve, the frac valve comprising:
a housing having a bore to convey the fracturing fluid and a cavity that is transverse to the bore;
a gate positioned in the cavity and movable between an open position and a closed position, the gate having an aperture that allows the fracturing fluid to flow through the frac valve via the bore and the aperture when the gate is in the open position, wherein:
the gate has a seal assembly having one or more seals, the seal assembly including a leading seal surface that is positioned to move transversely across the bore as the gate moves within the cavity from the open position to the closed position and a trailing seal surface that does not move across the bore as the gate moves within the cavity from the open position to the closed position;
the seal assembly is positioned to seal against a sidewall of the cavity to surround the bore and block flow through the frac valve when the gate is in the closed position; and
the seal assembly is actuatable between a less-energized state and a more-energized state following movement of the gate within the cavity from the open position to the closed position;
an actuator coupled to the gate via an actuation rod to move the gate between the open position and the closed position; and
a seal-energizing rod coupled to actuate the seal assembly between the less-energized state and the more-energized state.

20. The fracturing apparatus of claim 19, wherein: the seal-energizing rod extends into the gate; the fracturing apparatus includes an energizing block received in a body of the gate so as to extend outward from the seal-energizing rod toward the seal assembly; and the energizing block is received by an outward-facing ramped surface of the seal-energizing rod such that movement of the seal-energizing rod relative to the body of the gate causes movement of the energizing block to increase or decrease energization of the seal assembly.

* * * * *